(12) United States Patent
Inoue et al.

(10) Patent No.: US 11,205,908 B2
(45) Date of Patent: Dec. 21, 2021

(54) CHARGING SYSTEM, BATTERY PACK, AND CHARGER

(71) Applicant: MAKITA CORPORATION, Anjo (JP)

(72) Inventors: Hiroshi Inoue, Anjo (JP); Yoshihiro Ishikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 193 days.

(21) Appl. No.: 16/699,236

(22) Filed: Nov. 29, 2019

(65) Prior Publication Data

US 2020/0177005 A1 Jun. 4, 2020

(30) Foreign Application Priority Data

Nov. 30, 2018 (JP) .............................. JP2018-225649

(51) Int. Cl.
*H02J 7/00* (2006.01)
*H01M 10/42* (2006.01)
*H01M 10/46* (2006.01)
*H01M 50/543* (2021.01)

(52) U.S. Cl.
CPC ....... *H02J 7/0042* (2013.01); *H01M 10/4257* (2013.01); *H01M 10/46* (2013.01); *H01M 50/543* (2021.01); *H02J 7/0013* (2013.01); *H02J 7/0047* (2013.01); *H01M 2010/4271* (2013.01)

(58) Field of Classification Search
CPC ............................ H02J 7/0042; H01M 50/543
USPC ....................................................... 320/112
See application file for complete search history.

(56) References Cited

U.S. PATENT DOCUMENTS

| 5,644,211 | A | * | 7/1997 | Tokuyama | ............ | H02J 7/0029 320/162 |
| 5,982,148 | A | * | 11/1999 | Mercer | ................. | H02J 7/0069 320/134 |
| 2006/0232244 | A1 | * | 10/2006 | Vieira Formenti | ..... | H02J 7/027 320/128 |
| 2011/0250780 | A1 | | 10/2011 | Fukumoto et al. | | |
| 2013/0214592 | A1 | * | 8/2013 | Aragai | .................... | B60R 16/03 307/9.1 |
| 2016/0190830 | A1 | * | 6/2016 | Kuhlmann | .......... | H02J 7/00306 320/116 |
| 2018/0083478 | A1 | * | 3/2018 | Izu | ........................ | H02J 7/0036 |

(Continued)

FOREIGN PATENT DOCUMENTS

JP 5523905 B2 6/2014

*Primary Examiner* — Suchin Parihar
(74) *Attorney, Agent, or Firm* — Oliff PLC

(57) ABSTRACT

In one aspect, the present disclosure discloses a charging system including a battery pack and a charger. The battery pack includes a first battery pack terminal, a second battery pack terminal, and a third battery pack terminal. The second battery pack terminal is spaced apart from the first battery pack terminal in an intersecting direction. The intersecting direction intersects a removal direction of the battery pack from the charger. The charger includes a first charger terminal, a second charger terminal, and a third charger terminal. The second battery pack terminal is arranged so as to pass through an area spaced apart from the third charger terminal in a process of removing the battery pack from the charger.

10 Claims, 11 Drawing Sheets

(56) References Cited

U.S. PATENT DOCUMENTS

2020/0212505 A1\* 7/2020 Nakano .................... H02H 7/18
2020/0251918 A1\* 8/2020 Fu .......................... H02J 1/082

\* cited by examiner

CHARGING SYSTEM, BATTERY PACK, AND CHARGER

CROSS-REFERENCE TO RELATED APPLICATIONS

This application claims the benefit of Japanese Patent Application No. 2018-225649 filed on Nov. 30, 2018 with the Japan Patent Office, the disclosure of which is incorporated herein by reference.

BACKGROUND

The present disclosure relates to a battery pack.

Japanese Patent No. 5523905 discloses a battery pack attachable to and removable from a charger and an electric power tool. This battery pack is provided with two terminals aligned in a direction where the battery pack is removed from the charger or from the electric power tool.

SUMMARY

In recent years, the capacity of a battery in a battery pack used for an electric power tool has become increasingly larger. As the capacity of the battery is increased, the battery pack's electrical configuration to charge the battery becomes complicated. As a result, the number of terminals to be connected to a charger or to an electric power tool may be increased in the battery pack. Such increase in the number of the terminals may lead to a larger-sized battery pack.

One conceivable way of inhibiting the larger-sized battery pack caused by increase in the number of the terminals is to arrange two or more terminals in alignment in a removal direction of the battery pack as disclosed in the above-described Japanese Patent No. 5523905.

However, arranging the two or more terminals in alignment in the removal direction may cause the following problem. Specifically, in the process of removing the battery pack from the charger, a certain terminal in the charger removed from a counterpart terminal in the battery pack may contact a non-counterpart terminal in the battery pack. Such contact of the non-counterpart terminal with the terminal of the charger in the removal process may lead to a malfunction of the charger depending on an electrical state of the non-counterpart terminal.

It is desirable that the present disclosure enable, in one aspect thereof, inhibition of occurrence of a malfunction of a charger caused by contact of a terminal of the charger with a terminal of a battery pack being removed from the charger.

In one aspect, the present disclosure discloses a charging system. This charging system includes a battery pack and a charger. The battery pack is configured to be removably attached to an electric working machine. The charger is configured such that the battery pack is removably attached thereto.

The battery pack includes a battery, a first battery pack terminal, a second battery pack terminal, a third battery pack terminal, and/or a state setting circuit. The battery is configured to be charged with charging power supplied from the charger. The first battery pack terminal has a first electrical characteristic. The second battery pack terminal has a second electrical characteristic, or is configured to have the second electrical characteristic depending on an operating state of the battery pack. The second battery pack terminal is spaced apart from the first battery pack terminal in an intersecting direction. The intersecting direction intersects a removal direction of the battery pack from the charger. Specifically, assuming that a vector extends from the first battery pack terminal as a starting point to the second battery pack terminal as an ending point, a direction indicated by the vector corresponds to a direction normal to the removal direction. Alternatively, the vector is expressed by a sum of a first vector indicating the removal direction and a second vector indicating the direction normal to the removal direction. The removal direction corresponds to a direction in which the battery pack attached to the charger is moved during removal of the battery pack from the charger. The third battery pack terminal is aligned (i.e., arranged in a line) with the first battery pack terminal or with the second battery pack terminal in the removal direction. The state setting circuit sets, in response to the battery pack being in a presupposed operating state, an electrical characteristic of the third battery pack terminal such that the third battery pack terminal has the second electrical characteristic.

The charger includes a first charger terminal, a second charger terminal, a third charger terminal, and/or a functional circuit. The first charger terminal is configured to be connected to the first battery pack terminal in response to attachment of the battery pack to the charger. The second charger terminal is configured to be connected to the second battery pack terminal in response to attachment of the battery pack to the charger. The third charger terminal is configured to be connected to the third battery pack terminal in response to attachment of the battery pack to the charger. The functional circuit is configured to perform a first function in response to connection of the third battery pack terminal having the second electrical characteristic to the third charger terminal.

The second battery pack terminal is arranged so as to pass through an area spaced apart from the third charger terminal in a process of removing the battery pack from the charger (hereinafter referred to as a removal process).

In the thus-configured charging system, the third battery pack terminal is aligned (i.e., arranged in a line) with the first battery pack terminal or with the second battery pack terminal in the removal direction. The second battery pack terminal is arranged so as to pass through the area spaced apart from the third charger terminal in the removal process. In other words, the second battery pack terminal is arranged so as not to contact the third charger terminal in the removal process. This inhibits contact of the second battery pack terminal having the second electrical characteristic with the third charger terminal in the removal process. Consequently, it is possible to inhibit a malfunction of the charger (e.g., unintended performance of the first function by the functional circuit) caused by such contact.

The state setting circuit may be configured to determine whether a malfunction is present. The malfunction may correspond to an event in which charging of the battery has to be stopped in the battery pack. The presupposed operating state may correspond to a state in which the malfunction is not present.

In the thus-configured charging system, it is possible to notify the charger of whether the malfunction is present in the battery pack via the third battery pack terminal and the third charger terminal during charging of the battery by the charger. The third charger terminal is arranged such that the second battery pack terminal does not contact the third charger terminal in the removal process. Thus, in the removal process, the second battery pack terminal having the second electrical characteristic is inhibited from contacting the third charger terminal, to thereby further inhibit erroneous notification to the charger to the effect that the battery pack is in the presupposed operating state.

The first function may include output of an operation permission signal. The charger may further include a charging circuit, an electric power path, a switch circuit, a switch control circuit, an enabling circuit, and/or a forcible interruption circuit. The charging circuit is configured to generate the charging power. The electric power path is configured to supply the charging power to the battery pack. The switch circuit is configured to establish or interrupt the electric power path. The switch control circuit is configured to control the switch circuit. The enabling circuit is configured to enable control of the switch circuit by the switch control circuit in response to output of the operation permission signal. The forcible interruption circuit is configured to disable the control of the switch circuit by the switch control circuit to thereby cause the switch circuit to interrupt the electric power path, in response to no output of the operation permission signal.

In the thus-configured charging system, if the battery pack is in the presupposed operating state, control of the switch circuit by the switch control circuit can be enabled in the charger. As described above, the third charger terminal is arranged such that the second battery pack terminal does not contact the third charger terminal in the removal process. Thus, in the removal process, a situation is inhibited in which the second battery pack terminal having the second electrical characteristic contacts the third charger terminal to thereby cause erroneous output of the operation permission signal from the functional circuit.

The state setting circuit may be configured to set the third battery pack terminal such that the third battery pack terminal has, as the second electrical characteristic, a first input impedance within a specified range. The first battery pack terminal may have, as the first electrical characteristic, a second input impedance out of the specified range. The second battery pack terminal may have a third input impedance within the specified range, or may be configured to have the third input impedance depending on the operating state of the battery pack.

In the thus-configured charging system, it is possible to easily notify the charger that the battery pack is in the presupposed operating state by controlling the input impedance of the third battery pack terminal.

The third battery pack terminal may be aligned with the first battery pack terminal in the removal direction (i.e., the terminals may be arranged in a line).

In the thus-configured charging system, the third battery pack terminal is not arranged in alignment with the second battery pack terminal in the removal direction. Thus, the second battery pack terminal is appropriately inhibited from contacting the third charger terminal in the removal process.

The third battery pack terminal may be aligned with the second battery pack terminal in the removal direction (i.e., the terminals may be arranged in a line). Further, the third battery pack terminal may be arranged on an opposite side of the removal direction with respect to the second battery pack terminal.

In the thus-configured charging system, although the third battery pack terminal is arranged in alignment with the second battery pack terminal in the removal direction, the third battery pack terminal is arranged upstream of the second battery pack terminal in the removal direction (in other words, the second battery pack terminal is arranged downstream of the third battery pack terminal in the removal direction). Thus, in the removal process, the second battery pack terminal moves away from the third battery pack terminal in response to movement of the battery pack in the removal direction. This results in appropriate inhibition of contact of the second battery pack terminal with the third charger terminal in the removal process.

In another aspect, the present disclosure discloses a battery pack. This battery pack is configured to be removably attached to an electric working machine and to a charger. The charger includes a first charger terminal, a second charger terminal, and/or a third charger terminal. The battery pack includes a battery, a first battery pack terminal, a second battery pack terminal, a third battery pack terminal, and/or a state setting circuit.

The battery is configured to be charged with charging power supplied from the charger. The first battery pack terminal is configured to be connected to the first charger terminal in response to attachment of the battery pack to the charger. The first battery pack terminal has a first electrical characteristic. The second battery pack terminal is configured to be connected to the second charger terminal in response to attachment of the battery pack to the charger. The second battery pack terminal has a second electrical characteristic, or is configured to have the second electrical characteristic depending on an operating state of the battery pack. The second battery pack terminal is spaced apart from the first battery pack terminal in an intersecting direction. The intersecting direction intersects a removal direction of the battery pack from the charger. The third battery pack terminal is configured to be connected to the third charger terminal in response to attachment of the battery pack to the charger. The third battery pack terminal is aligned (i.e., arranged in a line) with the first battery pack terminal or with the second battery pack terminal in the removal direction. The state setting circuit is configured to set, in response to the battery pack being in a presupposed operating state, an electrical characteristic of the third battery pack terminal such that the third battery pack terminal has the second electrical characteristic.

The charger is configured to perform a first function in response to connection of the third battery pack terminal having the second electrical characteristic to the third charger terminal. The second battery pack terminal is arranged so as to pass through an area spaced apart from the third charger terminal in a process of removing the battery pack from the charger.

The thus-configured battery pack enables inhibition of contact of the second battery pack terminal with the third charger terminal in the process of removing the battery pack from the charger, to thereby further inhibit a malfunction of the charger caused by such contact.

In yet another aspect, the present disclosure discloses a charger. This charger is configured such that a battery pack is removably attached thereto. The battery pack includes a first battery pack terminal, a second battery pack terminal, and/or a third battery pack terminal. The charger is configured to supply charging power to the battery pack.

The charger includes a first charger terminal, a second charger terminal, a third charger terminal, and/or a functional circuit. The first charger terminal is configured to be connected to the first battery pack terminal in response to attachment of the battery pack to the charger. The first battery pack terminal has a first electrical characteristic. The second charger terminal is configured to be connected to the second battery pack terminal in response to attachment of the battery pack to the charger. The second battery pack terminal has a second electrical characteristic, or is configured to have the second electrical characteristic depending on an operating state of the battery pack. The second charger terminal is spaced apart from the first charger terminal in an intersecting direction. The intersecting direction intersects a removal direction of the battery pack from the charger. The third charger terminal is configured to be connected to the third battery pack terminal in response to attachment of the battery pack to the charger. The third charger terminal is aligned (i.e., arranged in a line) with the first charger terminal or with the second charger terminal in the removal direction. The third battery pack terminal has the second electrical characteristic in response to the battery pack being in a presupposed operating state. The functional circuit is configured to perform a first function in response to connection of the third battery pack terminal having the second electrical characteristic to the third charger terminal.

The third charger terminal is arranged so as to pass through an area spaced apart from the second battery pack terminal in a process of removing the battery pack from the charger.

The thus-configured charger enables inhibition of contact of the second battery pack terminal with the third charger terminal in the process of removing the battery pack from the charger, to thereby further inhibit a malfunction of the charger (e.g., unintended performance of the first function by the functional circuit) caused by such contact.

BRIEF DESCRIPTION OF THE DRAWINGS

An example embodiment of the present disclosure will be described below with reference to the accompanying drawings, in which.

DETAILED DESCRIPTION OF EXEMPLARY EMBODIMENTS

Example Embodiment (1) Overview of Charging System and Electric Working Machine A charging system and an electric working machine of the present embodiment will be described with reference to FIGS. 1 to 3.

Figure 1:
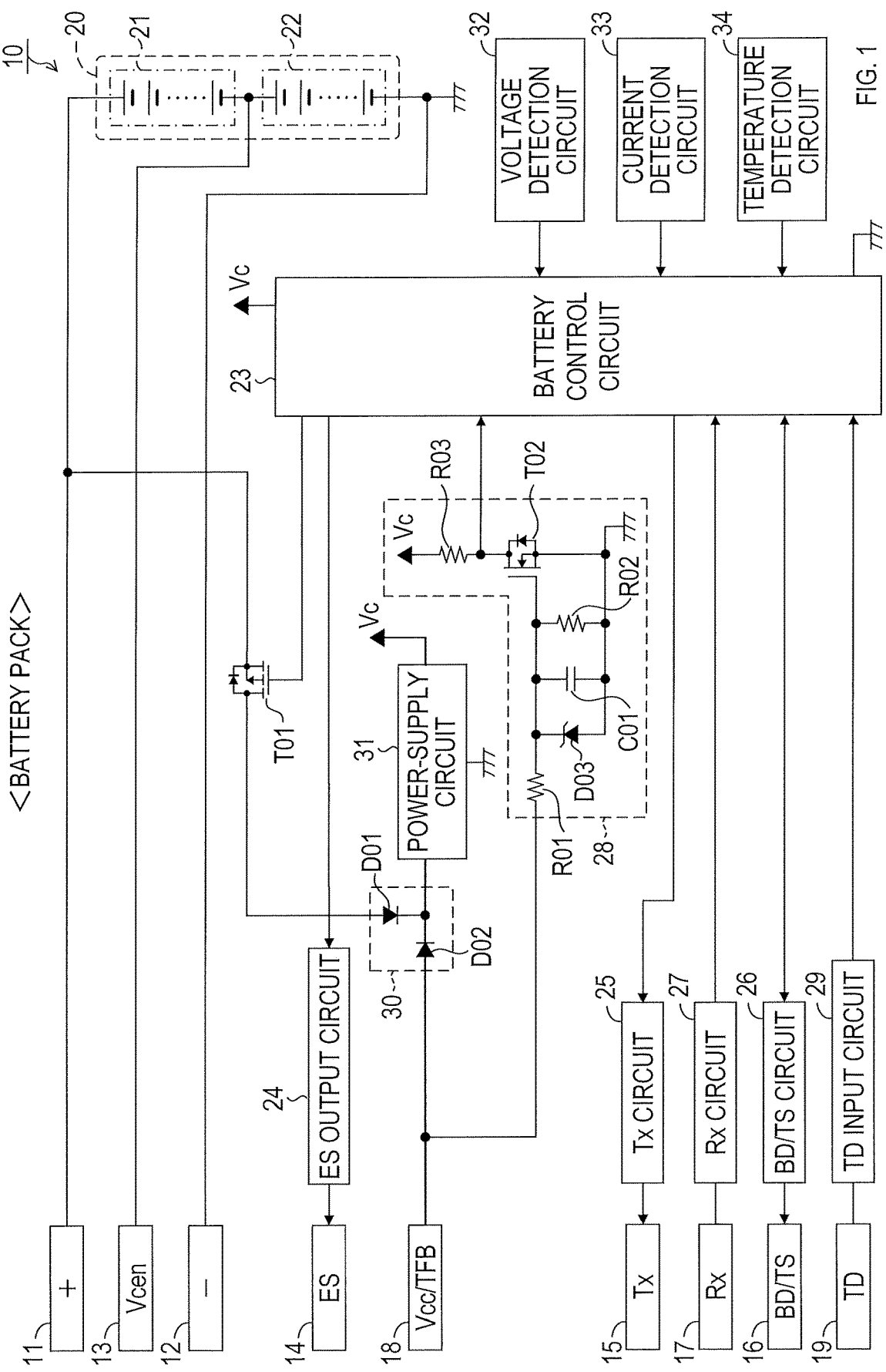
FIG. 1 is an explanatory diagram showing an electrical configuration of a battery pack of the embodiment.
Figure 2:
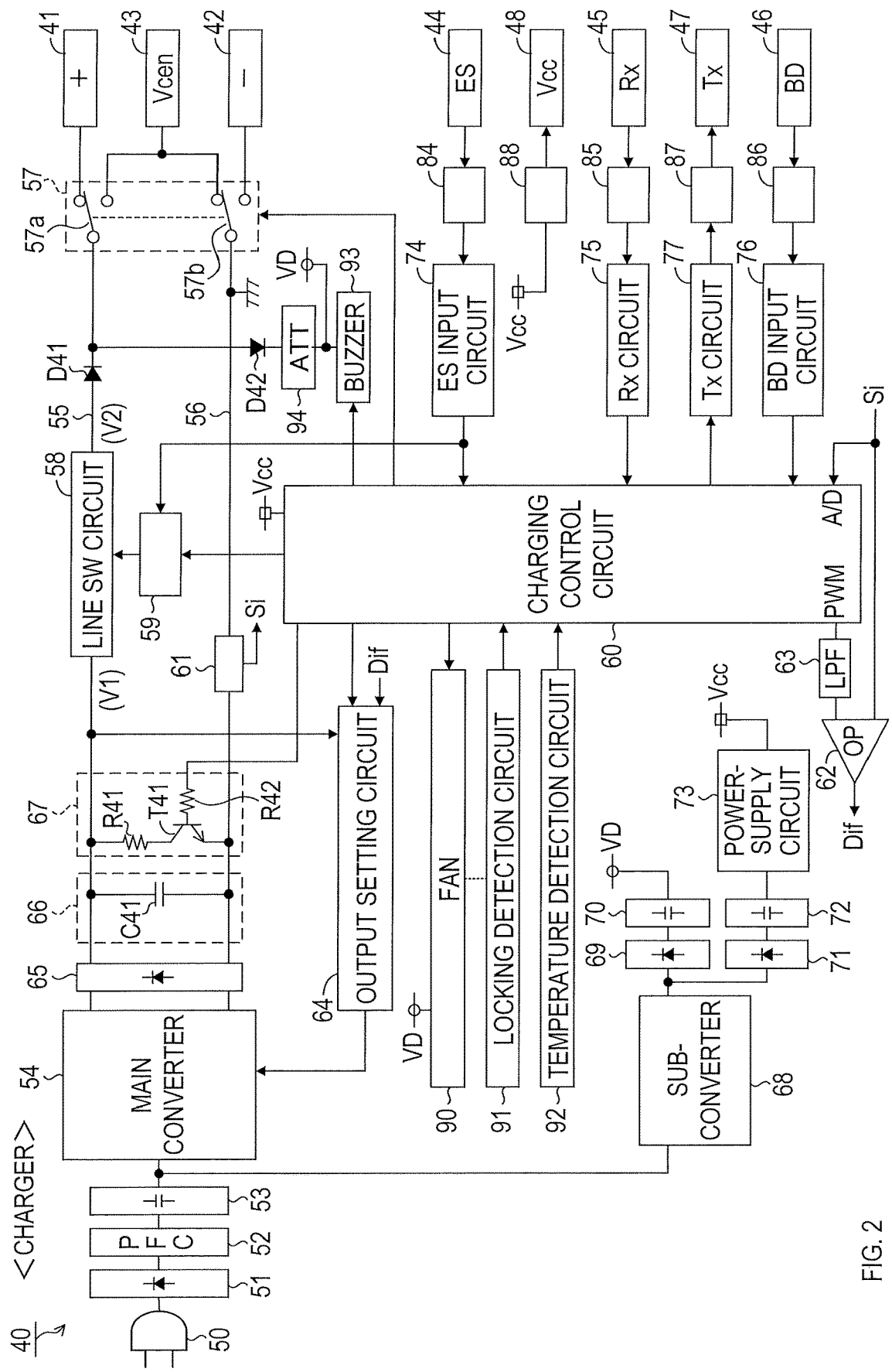
FIG. 2 is an explanatory diagram showing an electrical configuration of a charger of the embodiment.

The charging system of the present embodiment includes a battery pack 10 shown in FIG. 1 and a charger 40 shown in FIG. 2. The charger 40 is configured such that the battery pack 10 is attachable thereto and removable therefrom.

As shown in FIG. 1, the battery pack 10 includes a battery 20. The battery 20 is a rechargeable battery. The battery 20 may be any kind of rechargeable battery. In the present embodiment, the battery 20 is, for example, a lithium-ion battery.

More specifically, the battery 20 includes a first cell group 21 and a second cell group 22, which are connected to each other in series. Each of the first cell group 21 and the second cell group 22 includes two or more cells. The two or more cells may be connected to each other in any manner. In the present embodiment, for example, the two or more cells are connected to each other in series in each of the first cell group 21 and the second cell group 22.

Rated voltage values of the first cell group 21 and the second cell group 22 may be any values. In the present embodiment, the rated voltage values of the first cell group 21 and the second cell group 22 are each, for example, 28.8 V, and a rated voltage value of the battery 20 is, for example, 57.6 V. The first cell group 21 and the second cell group 22 of the present embodiment each include, for example, eight cells connected to each other in series. A rated voltage value of each cell is, for example, 3.6 V. An actual voltage value of the battery 20 may vary according to a charging state of the battery 20. Specifically, the voltage value of the battery 20 may be a value lower than 57.6 V, and also may be a value higher than 57.6 V (e.g., 64 V). The number of the cells in the battery 20 may be any number. The rated voltage value of each cell may be any value. The rated voltage value of the battery 20 may be any value.

In response to attachment of the battery pack 10 to the charger 40, the charger 40 performs data communication with the battery pack 10 to acquire various information on charging of the battery 20. The charger 40 supplies charging power to the battery 20 based on the various information acquired from the battery pack 10, to thereby charge the battery 20.

The battery pack 10 is attachable to and removable from various electric apparatuses, such as a working machine body 200 (see FIG. 3) to be described below. The battery pack 10 is configured to supply electric power of the battery 20 (hereinafter referred to as "battery power") to the electric apparatus to which the battery pack 10 is attached.

Figure 3:
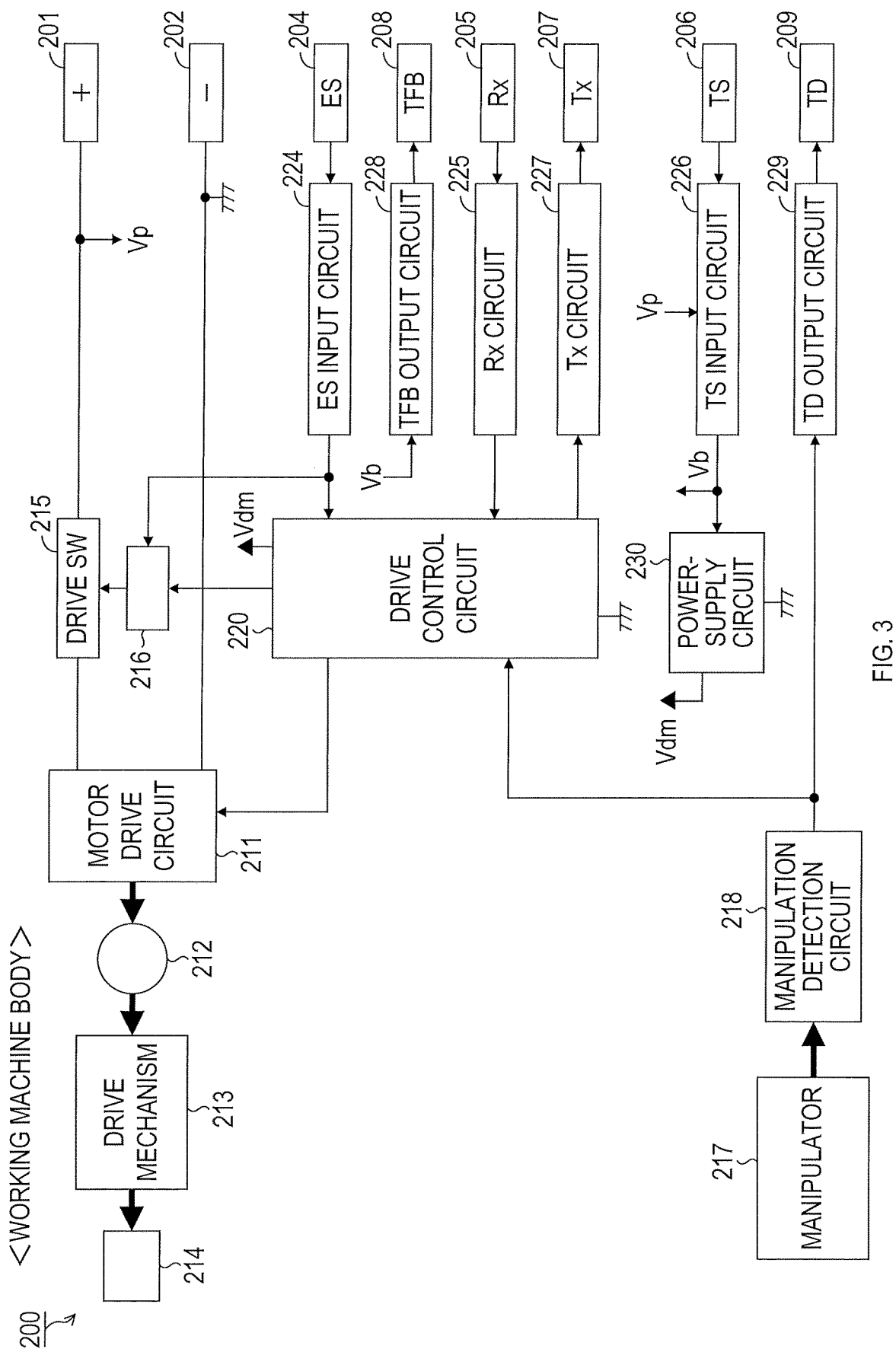
FIG. 3 is an explanatory diagram showing an electrical configuration of a working machine body of the embodiment.

The electric working machine of the present embodiment includes the battery pack 10 shown in FIG. 1 and the working machine body 200 shown in FIG. 3. The working machine body 200 is configured such that the battery pack 10 is attachable thereto and removable therefrom.

In response to attachment of the battery pack 10 to the working machine body 200, the battery power is supplied to the working machine body 200. The working machine body 200 is operated with the battery power.

The working machine body 200 is configured to perform operations for any of various applications, such as gardening, stone processing, metal processing, and wood processing. The electric working machine of the present embodiment may be, for example, a rechargeable brush cutter for cutting grass, small-diameter trees, and so on.

(2) Configuration of Battery Pack

As shown in FIG. 1, the battery pack 10 includes a positive terminal 11, a negative terminal 12, a center terminal 13, an error stop (ES) terminal 14, a transmission (Tx) terminal 15, a battery detection (BD)/tool shutdown (TS) terminal 16, a reception (Rx) terminal 17, a Vcc/TFB terminal 18, and a trigger detection (TD) terminal 19.

The positive terminal 11 is connected to a positive electrode of the battery 20 (specifically, a positive electrode of the first cell group 21). The negative terminal 12 is connected to a negative electrode of the battery 20 (specifically, a negative electrode of the second cell group 22). The center terminal 13 is connected to a positive electrode of the second cell group 22 of the battery 20 (in other words, a negative electrode of the first cell group 21).

The battery pack 10 further includes a battery control circuit 23, an ES output circuit 24, a Tx circuit 25, a BD/TS circuit 26, an Rx circuit 27, an attachment detection circuit 28, a TD input circuit 29, a power-supply input circuit 30, a power-supply circuit 31, a voltage detection circuit 32, a current detection circuit 33, and a temperature detection circuit 34.

The ES output circuit 24 is connected to the ES terminal 14. The Tx circuit 25 is connected to the Tx terminal 15. The BD/TS circuit 26 is connected to the BD/TS terminal 16. The Rx circuit 27 is connected to the Rx terminal 17. The attachment detection circuit 28 is connected to the Vcc/TFB terminal 18. The TD input circuit 29 is connected to the TD terminal 19. The ES output circuit 24, the Tx circuit 25, the BD/TS circuit 26, the Rx circuit 27, the attachment detection circuit 28, and the TD input circuit 29 are connected to the battery control circuit 23.

The voltage detection circuit 32 outputs battery voltage information to the battery control circuit 23. The battery voltage information indicates a value (hereinafter referred to as a "battery voltage value") of voltage (hereinafter referred to as a "battery voltage") of the battery 20. The battery voltage information indicates, for example, a voltage value of the first cell group 21, a voltage value of the second cell group 22, and/or a voltage value of the battery 20.

During discharge from the battery 20 to the electric apparatus, the current detection circuit 33 outputs discharge current information to the battery control circuit 23. The discharge current information indicates a value of discharge current from the battery 20. During charging of the battery 20 by the charger 40, the current detection circuit 33 outputs charging current information to the battery control circuit 23. The charging current information indicates a value of charging current supplied from the charger 40 to the battery 20.

The temperature detection circuit 34 detects a temperature of the battery 20, and outputs temperature information to the battery control circuit 23. The temperature information indicates a temperature of the battery 20 detected by the temperature detection circuit 34.

The battery control circuit 23 controls charging and discharge of the battery 20 based on various information, such as the battery voltage information, the discharge current information, the charging current information, and the temperature information. During charging of the battery 20 by the charger 40, the battery control circuit 23 transmits information required for charging to the charger 40, and/or receives such information from the charger 40 by performing data communication with the charger 40. The battery control circuit 23 calculates a value of charging current required for charging the battery 20 based on, for example, the battery voltage, and transmits a charging current command value to the charger 40. The charging current command value indicates the value calculated by the battery control circuit 23.

The battery control circuit 23 includes a microcomputer including, for example, a CPU and a memory. The memory may include a semiconductor memory, such as a RAM, a ROM, or a flash memory. The memory stores various programs and data to be read and executed in order for the CPU to achieve various functions of the battery pack 10. Such various functions are not limited to the above-described software processing, and some or all of them may be achieved by hardware including a combination of logic circuits and analog circuits.

The power-supply input circuit 30 includes a first diode D01 and a second diode D02. An anode of the first diode D01 is connected to the positive electrode of the battery 20 via a switching element T01. In the present embodiment, the switching element T01 is, for example, a p-channel metal-oxide-semiconductor field-effect transistor (MOSFET). The anode of the first diode D01 is connected to a drain of the switching element T01. A source of the switching element T01 is connected to the positive electrode of the battery 20. A gate of the switching element T01 is connected to the battery control circuit 23.

An anode of the second diode D02 is connected to the Vcc/TFB terminal 18. A cathode of the first diode D01 and a cathode of the second diode D02 are connected to each other and also connected to an input terminal of the power-supply circuit 31.

The battery control circuit 23 determines whether the battery 20 is in an over-discharge state based on the battery voltage information input from the voltage detection circuit 32. The battery control circuit 23 may determine whether the battery 20 is in an over-discharge state in any manner. For example, the battery control circuit 23 may determine that the battery 20 is in an over-discharge state if the battery voltage value indicated by the battery voltage information is lower than a specified voltage lower limit.

During a period in which the battery 20 is not in an over-discharge state, the battery control circuit 23 turns on the switching element T01 to thereby supply the battery power to the power-supply circuit 31 via the switching element T01 and the first diode D01. If the battery control circuit 23 determines that the battery 20 is in an over-discharge state, the battery control circuit 23 turns off the switching element T01 to thereby interrupt supply of the battery power to the power-supply circuit 31.

The voltage detection circuit 32 may output information indicating a voltage value of each of the cells in the battery 20 to the battery control circuit 23. In this case, the battery control circuit 23 may determine that the battery 20 is in an over-discharge state if the voltage value of at least one cell is lower than a specified cell voltage lower limit.

Alternatively, instead of the battery control circuit 23, the voltage detection circuit 32 may determine that the battery 20 is in an over-discharge state if the battery voltage value is lower than the specified voltage lower limit, or if the voltage value of at least one cell is lower than the specified cell voltage lower limit. In this case, the battery control circuit 23 may turn off the switching element T01 in response to determination of the over-discharge state by the voltage detection circuit 32.

The power-supply circuit 31 generates a control voltage Vc of a direct current based on an input voltage of a direct current to the power-supply circuit 31. The control voltage Vc is lower than the input voltage. The control voltage Vc is supplied to relevant portions within the battery pack 10, including the battery control circuit 23.

If the battery 20 is not in an over-discharge state, the battery voltage is input to the power-supply circuit 31 via the switching element T01 and the first diode D01. In this case, the power-supply circuit 31 converts the battery voltage into the control voltage Vc and outputs the control voltage Vc.

In response to the battery 20 entering an over-discharge state, the battery control circuit 23 sets the battery control circuit 23 itself to a shutdown mode. Specifically, the battery control circuit 23 turns off the switching element T01 to interrupt input of the battery voltage to the power-supply circuit 31. As a result, the power-supply circuit 31 stops output of the control voltage Vc, thus stopping operation of the battery control circuit 23.

The battery control circuit 23 in the shutdown mode cannot turn on the switching element T01 by itself. Attachment of the battery pack 10 to the charger 40 in operation disengages the shutdown mode.

Figure 5:
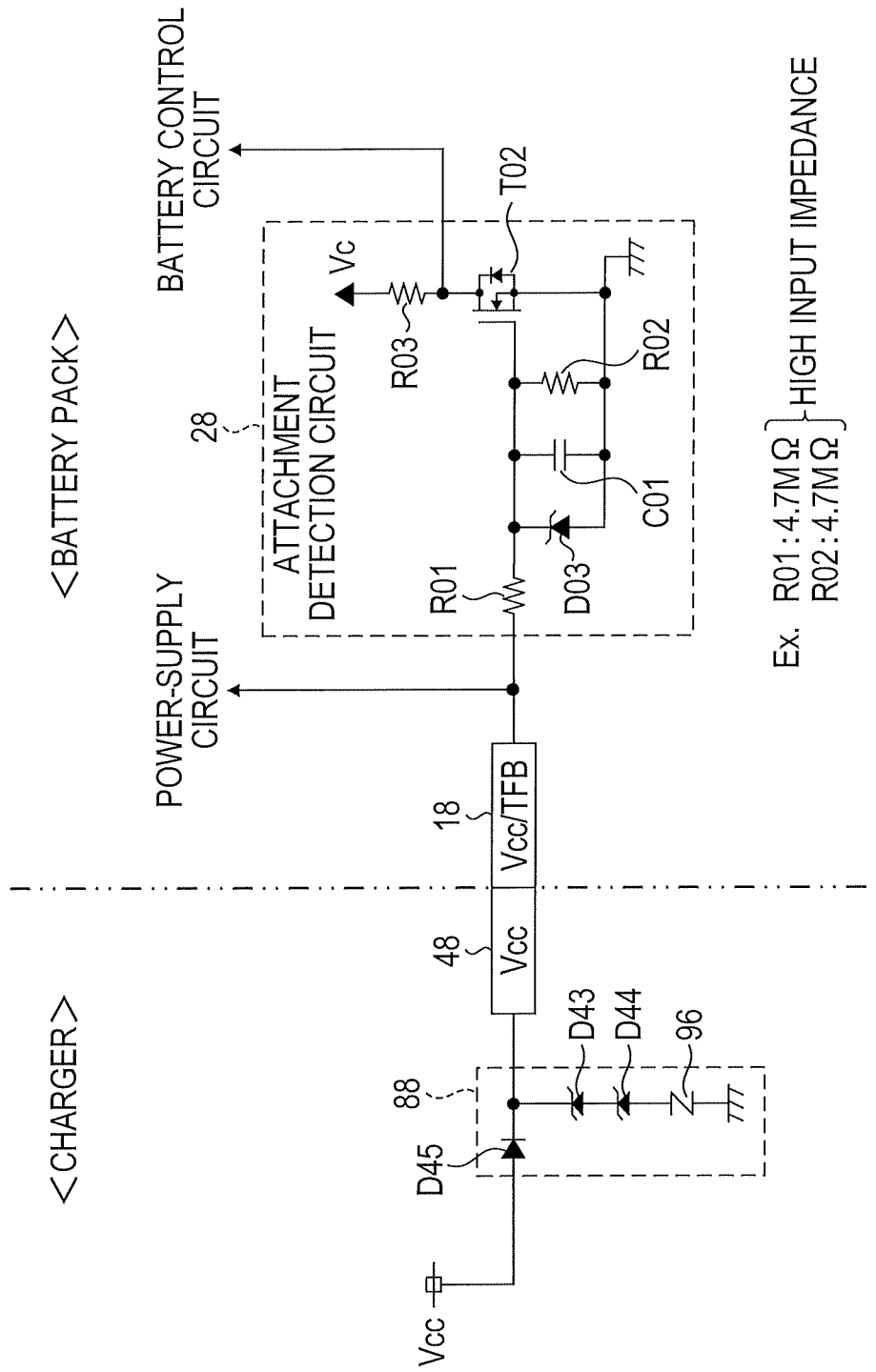
FIG. 5 is an electric circuit diagram showing a Vcc terminal of the charger and a Vcc/TFB terminal of the battery pack, and details of electric circuits connected to these terminals.

In response to attachment of the battery pack 10 to the charger 40 in operation, as shown in FIG. 5, a first power supply voltage Vcc to be described below is input from the charger 40 to the Vcc/TFB terminal 18. The first power supply voltage Vcc input to the Vcc/TFB terminal 18 is input to the power-supply circuit 31 via the second diode D02 shown in FIG. 1. In response to input of the first power supply voltage Vcc to the power-supply circuit 31 during the shutdown mode of the battery control circuit 23, the power-supply circuit 31 generates the control voltage Vc based on the first power supply voltage Vcc (i.e., converts the first power supply voltage Vcc into the control voltage Vc). Supply of the control voltage Vc from the power-supply circuit 31 to the battery control circuit 23 activates the battery control circuit 23. The battery control circuit 23 activated from the shutdown mode turns on the switching element T01 in response to the battery voltage value reaching the voltage lower limit by charging of the battery 20. As a result, the battery voltage is input to the power-supply circuit 31, and it becomes possible for the power-supply circuit 31 to generate the control voltage Vc based on the battery voltage.

The power-supply circuit 31 may be configured in any manner. The power-supply circuit 31 may include a switching regulator, and may be configured to convert the input voltage into the control voltage Vc with the switching regulator. Alternatively, the power-supply circuit 31 may include a linear regulator, and may be configured to convert the input voltage into the control voltage Vc with the linear regulator. The control voltage Vc may have any voltage value. The first power supply voltage Vcc may have any voltage value. In the present embodiment, the power-supply circuit 31 includes, for example, a linear regulator; the first power supply voltage Vcc is, for example, 5 V; and the control voltage Vc is, for example, 3.3 V.

The first power supply voltage Vcc input from the charger 40 to the Vcc/TFB terminal 18 is further input to the attachment detection circuit 28. In response to attachment of the battery pack 10 to the working machine body 200, a body detection voltage is input to the Vcc/TFB terminal 18 from the working machine body 200.

The attachment detection circuit 28 is provided in order for the battery control circuit 23 to detect that the battery pack 10 is attached to the charger 40 or to the working machine body 200. As shown in FIGS. 1 and 5, the attachment detection circuit 28 includes resistors R01, R02, and R03, a Zener diode D03, a capacitor C01, and a switching element T02. In the present embodiment, the switching element T02 is, for example, an n-channel MOSFET.

A first terminal of the resistor R01 is connected to the Vcc/TFB terminal 18, and a second terminal of the resistor R01 is connected to a gate of the switching element T02. A source of the switching element T02 is connected to a ground line having a reference potential in the battery pack 10. The Zener diode D03, the capacitor C01, and the resistor R02 are each connected between the gate of the switching element T02 and the ground line. A drain of the switching element T02 is connected to a first terminal of the resistor R03 and to the battery control circuit 23. The control voltage Vc is input to a second terminal of the resistor R03.

If the battery pack 10 is attached to neither the charger 40 nor the working machine body 200, the switching element T02 is turned off. In this case, a non-attachment signal (specifically, a HIGH-level signal) is input from the attachment detection circuit 28 to the battery control circuit 23.

As shown in FIG. 5, in response to attachment of the battery pack 10 to the charger 40, the first power supply voltage Vcc is input from the charger 40 to the attachment detection circuit 28 via the Vcc/TFB terminal 18, and the switching element T02 is turned on. In this case, an attachment signal (specifically, a LOW-level signal) is output from the attachment detection circuit 28 to the battery control circuit 23.

In response to attachment of the battery pack 10 to the working machine body 200, the body detection voltage is input from the working machine body 200 to the attachment detection circuit 28 via the Vcc/TFB terminal 18, and the switching element T02 is turned on. In this case, the above-described attachment signal is input from the attachment detection circuit 28 to the battery control circuit 23.

The battery control circuit 23 can detect whether the battery pack 10 is not attached to anything or attached to the charger 40 or to the working machine body 200, based on the non-attachment signal or the attachment signal, respectively, input from the attachment detection circuit 28.

The battery control circuit 23 has a serial communication function. Specifically, the battery control circuit 23 transmits transmission data from the Tx terminal 15 via the Tx circuit 25. Further, the battery control circuit 23 receives reception data input to the Rx terminal 17 via the Rx circuit 27.

The transmission data is represented by a binary signal of a HIGH level or a LOW level. In the Tx circuit 25, an input impedance from the perspective of the Tx terminal 15 varies to a low impedance or a high impedance according to a logic level of a signal input from the battery control circuit 23. The low impedance refers to, for example, an impedance lower than or equal to a first threshold, and the high impedance refers to, for example, an impedance higher than a second threshold. The second threshold may be the same as the first threshold, or may be larger than the first threshold.

While the transmission data is not transmitted, the battery control circuit 23 continuously outputs a HIGH-level signal indicating a transmission standby state to the Tx circuit 25. In the transmission standby state, the input impedance of the Tx terminal 15 is a low impedance (e.g., approximately 10.5 kΩ). The battery control circuit 23 outputs a HIGH-level signal or a LOW-level signal to the Tx circuit 25 based on details of the transmission data. If a LOW-level signal is output from the battery control circuit 23 to the Tx circuit 25, the input impedance of the Tx terminal 15 becomes a high impedance.

An input impedance of the Vcc/TFB terminal 18, namely, an input impedance of the attachment detection circuit 28 from the perspective of the Vcc/TFB terminal 18, is a high impedance (e.g., approximately 9.4 MΩ, see FIG. 5) in the present embodiment.

Figure 6:
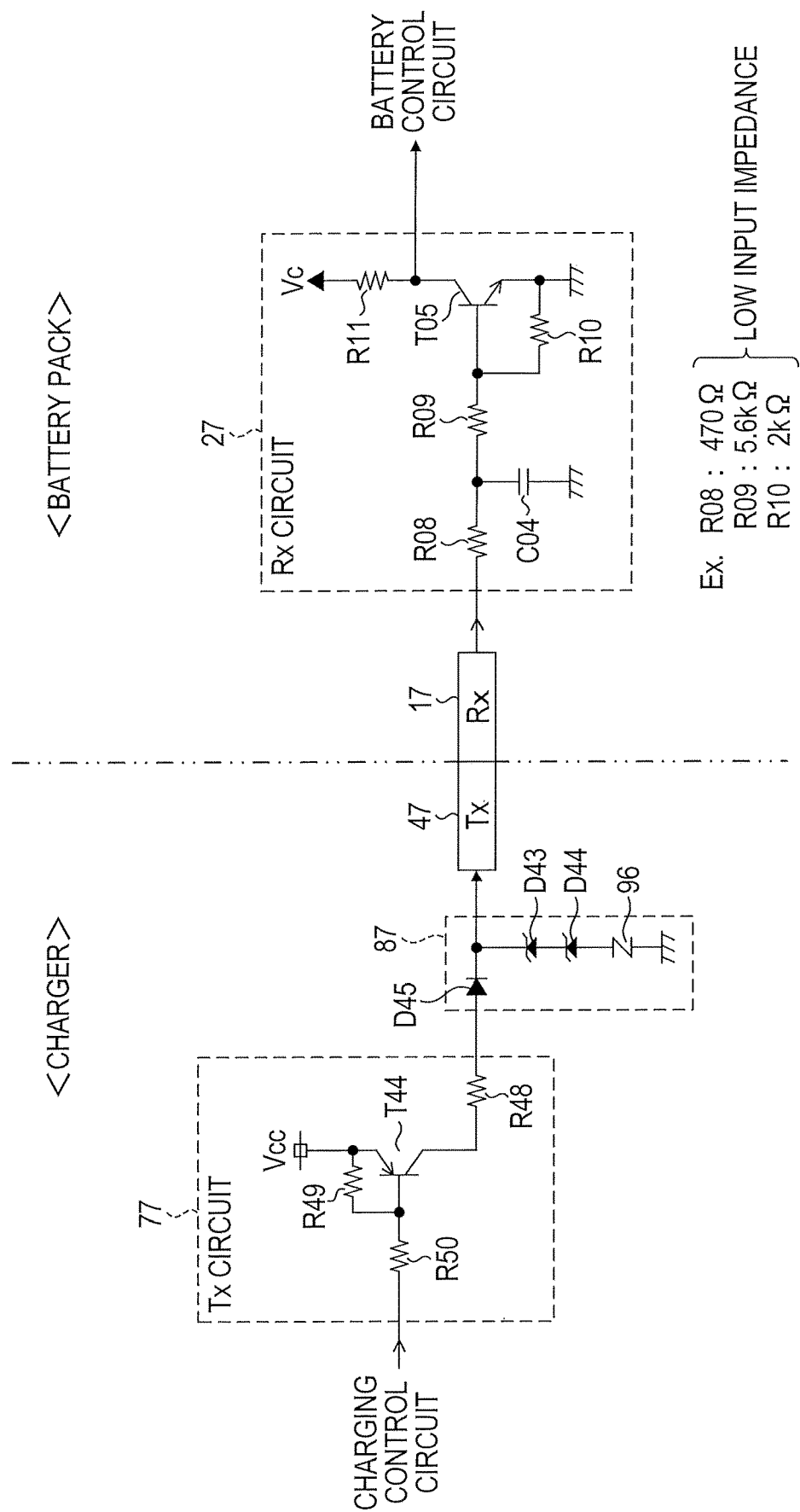
FIG. 6 is an electric circuit diagram showing a Tx terminal of the charger and an Rx terminal of the battery pack, and details of electric circuits connected to these terminals.

The reception data input to the Rx terminal 17 of the battery pack 10 is represented by a binary signal of a HIGH level or a LOW level. As shown in FIG. 6, the Rx circuit 27 in the battery pack 10 includes resistors R08, R09, R10, and R11, a capacitor C04, and a switching element T05. In the present embodiment, the switching element T05 is, for example, an NPN-type bipolar transistor.

A first terminal of the resistor R08 is connected to the Rx terminal 17, and a second terminal of the resistor R08 is connected to a first terminal of the resistor R09. A second terminal of the resistor R09 is connected to a base of the switching element T05. An emitter of the switching element T05 is connected to the ground line. The resistor R10 is connected between the base and the emitter of the switching element T05. The capacitor C04 is connected between the second terminal of the resistor R08 and the ground line. A collector of the switching element T05 is connected to a first terminal of the resistor R11 and to the battery control circuit 23. The control voltage Vc is input to a second terminal of the resistor R11.

An input impedance of the Rx terminal 17, namely, an input impedance of the Rx circuit 27 from the perspective of the Rx terminal 17, is a low impedance (e.g., approximately 8 kΩ) in the present embodiment, regardless of whether the switching element T05 is ON or OFF.

In response to input of a LOW-level signal to the Rx terminal 17, the switching element T05 in the Rx circuit 27 is turned off. In this case, a HIGH-level signal is input from the Rx circuit 27 to the battery control circuit 23. In response to input of a HIGH-level signal to the Rx terminal 17, the switching element T05 is turned on. In this case, a LOW-level signal is input from the Rx circuit 27 to the battery control circuit 23. The battery control circuit 23 recognizes details of the reception data based on a logic level of the signal input from the Rx circuit 27.

The battery control circuit 23 outputs a LOW-level signal or a HIGH-level signal to the BD/TS circuit 26 depending on whether the battery 20 is in an over-discharge state, to thereby change an input impedance of the BD/TS terminal 16, namely, an input impedance of the BD/TS circuit 26 from the perspective of the BD/TS terminal 16, to a first impedance or a second impedance. The first impedance and the second impedance are each a high impedance; however, the second impedance is higher than the first impedance.

Specifically, if the battery 20 is not in an over-discharge state, the battery control circuit 23 outputs a HIGH-level signal to the BD/TS circuit 26, to thereby set the input impedance of the BD/TS terminal 16 to the first impedance (e.g., approximately 6.2 MΩ). If the battery 20 is in an over-discharge state, the battery control circuit 23 outputs a LOW-level signal to the BD/TS circuit 26, to thereby set the input impedance of the BD/TS terminal 16 to the second impedance.

A manipulation signal is input to the TD terminal 19 from the working machine body 200. This manipulation signal is a binary signal of a HIGH level or a LOW level, and indicates whether a manipulator 217 (see FIG. 3) to be described later is manipulated by a user of the electric working machine. The manipulation signal is, for example, a LOW level if the manipulator 217 is not manipulated, and is, for example, a HIGH level if the manipulator 217 is manipulated.

If the manipulation signal of a LOW level is input to the TD terminal 19, the TD input circuit 29 outputs, to the battery control circuit 23, manipulation information (e.g., a HIGH-level signal) indicating that the manipulator 217 is not manipulated. If the manipulation signal of a HIGH level is input to the TD terminal 19, the TD input circuit 29 outputs, to the battery control circuit 23, manipulation information (e.g., a LOW-level signal) indicating that the manipulator 217 is manipulated. The battery control circuit 23 can recognize whether the manipulator 217 is manipulated, based on the manipulation information input from the TD input circuit 29.

An input impedance of the TD terminal 19, namely, an input impedance of the TD input circuit 29 from the perspective of the TD terminal 19, is a high impedance (e.g., approximately 110 kΩ) in the present embodiment.

The battery control circuit 23 monitors whether the battery pack 10 is in a specific improper state, and outputs a permission command or a prohibition command to the ES output circuit 24 depending on a result of the monitoring. The specific improper state may be, for example, a state in which discharge from the battery 20 and charging of the battery 20 should be stopped.

The battery control circuit 23 may determine whether the battery pack 10 is in the specific improper state in any manner. The battery control circuit 23 may determine whether the battery pack 10 is in the specific improper state based on, for example, at least the battery voltage information, the discharge current information, the charging current information, or the temperature information, which are described above.

The specific improper state may be any state. The battery control circuit 23 may determine that the battery pack 10 is in the specific improper state if, for example, the battery 20 is in an over-discharge state or if the over-discharge state continues for a specified period of time. The battery control circuit 23 may determine that the battery pack 10 is in the specific improper state if, for example, the value of discharge current from the battery 20 exceeds a specified current upper limit or if a state in which the value of discharge current from the battery 20 is higher than the current upper limit continues for a specified period of time. The battery control circuit 23 may determine that the battery pack 10 is in the specific improper state if, for example, a temperature of the battery 20 exceeds a specified temperature upper limit or if a state in which the temperature is higher than the temperature upper limit continues for a specified period of time.

If the battery pack 10 is not in the specific improper state, the battery control circuit 23 outputs the permission command (e.g., a HIGH-level signal in the present embodiment) to the ES output circuit 24. If the battery pack 10 is in the specific improper state, the battery control circuit 23 outputs the prohibition command (e.g., a LOW-level signal in the present embodiment) to the ES output circuit 24.

Figure 4:
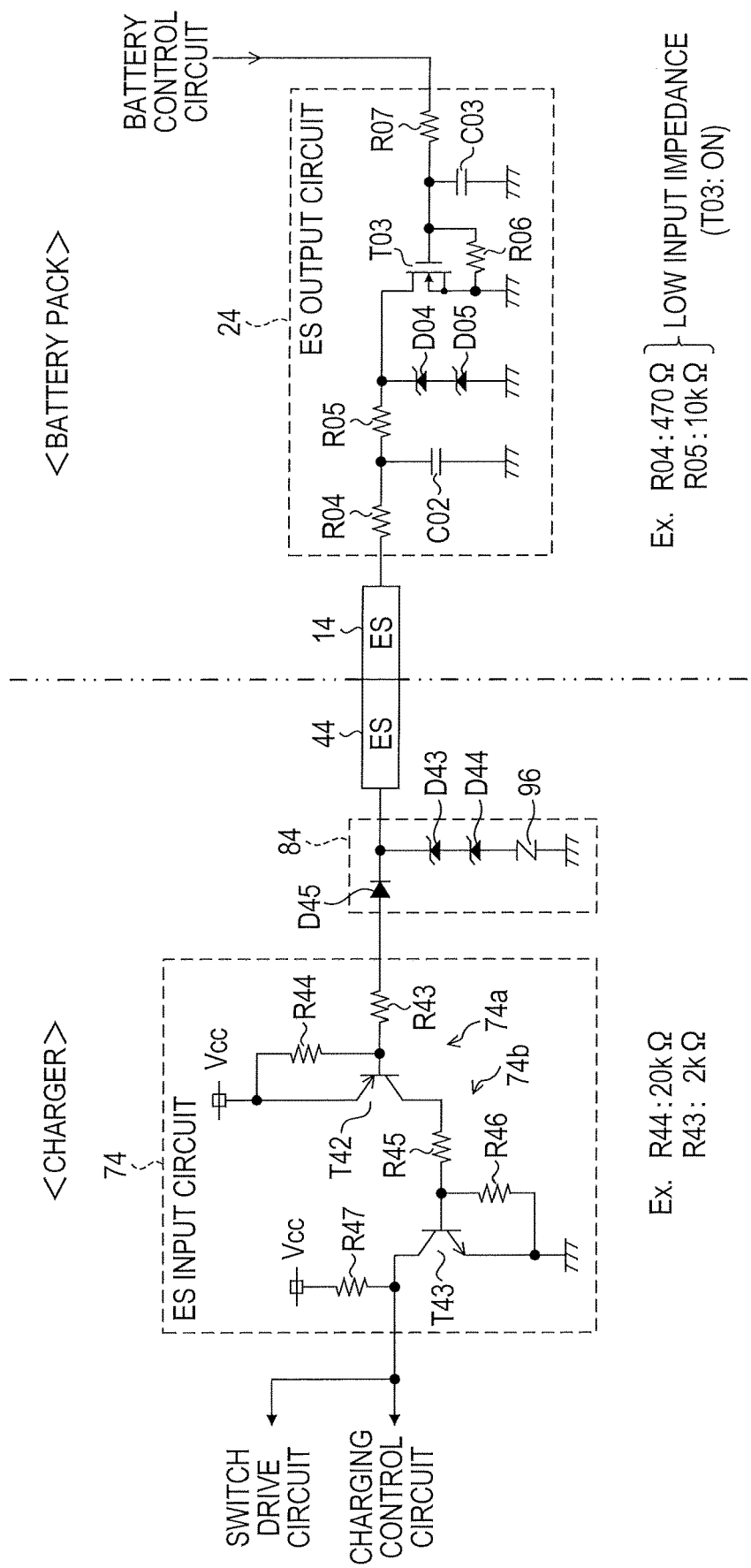
FIG. 4 is an electric circuit diagram showing an ES terminal of the charger and an ES terminal of the battery pack, and details of electric circuits connected to these terminals.

As shown in FIG. 4, the ES output circuit 24 of the present embodiment includes resistors R04, R05, R06, and R07, capacitors C02 and C03, Zener diodes D04 and D05, and a switching element T03. In the present embodiment, the switching element T03 is, for example, an n-channel MOSFET.

Input from the battery control circuit 23 to a first terminal of the resistor R07 is the permission command (HIGH level) or the prohibition command (LOW level). A second terminal of the resistor R07 is connected to a gate of the switching element T03. A source of the switching element T03 is connected to the ground line. The resistor R06 and the capacitor C03 are each connected between the gate of the switching element T03 and the ground line. A drain of the switching element T03 is connected to a first terminal of the resistor R05 and to a cathode of the Zener diode D04. An anode of the Zener diode D04 is connected to a cathode of the Zener diode D05, and an anode of the Zener diode D05 is connected to the ground line. A second terminal of the resistor R05 is connected to a first terminal of the resistor R04. A second terminal of the resistor R04 is connected to the ES terminal 14. The capacitor C02 is connected between the first terminal of the resistor R04 and the ground line.

In response to input of the permission command (HIGH level) from the battery control circuit 23 to the ES output circuit 24 configured as above, the switching element T03 is turned on in the ES output circuit 24. As a result, an input impedance of the ES terminal 14, namely, an input impedance of the ES output circuit 24 from the perspective of the ES terminal 14, becomes a low impedance (e.g., approximately 10.5 kΩ). In other words, a logic level of the ES terminal 14 becomes a LOW level.

On the other hand, in response to input of the prohibition command (LOW level) from the battery control circuit 23 to the ES output circuit 24, the switching element T03 is turned off in the ES output circuit 24. As a result, the input impedance of the ES terminal 14 becomes a high impedance.

(3) Configuration of Charger

As shown in FIG. 2, the charger 40 includes a positive terminal 41, a negative terminal 42, a center terminal 43, an ES terminal 44, an Rx terminal 45, a BD terminal 46, a Tx terminal 47, and a Vcc terminal 48.

In response to attachment of the battery pack 10 to the charger 40, the above-described terminals of the charger 40 are connected to the terminals of the battery pack 10 as follows. The positive terminal 41 is connected to the positive terminal 11 of the battery pack 10. The negative terminal 42 is connected to the negative terminal 12 of the battery pack 10. The center terminal 43 is connected to the center terminal 13 of the battery pack 10. The ES terminal 44 is connected to the ES terminal 14 of the battery pack 10. The Rx terminal 45 is connected to the Tx terminal 15 of the battery pack 10. The BD terminal 46 is connected to the BD/TS terminal 16 of the battery pack 10. The Tx terminal 47 is connected to the Rx terminal 17 of the battery pack 10. The Vcc terminal 48 is connected to the Vcc/TFB terminal 18 of the battery pack 10.

The charger 40 includes no counterpart terminal to the TD terminal 19 of the battery pack 10. Thus, in response to attachment of the battery pack 10 to the charger 40, the TD terminal 19 of the battery pack 10 is not electrically connected to the charger 40 and is electrically open.

The charger 40 further includes a power plug 50, a rectifier circuit 51, a power factor correction (PFC) circuit 52, a smoothing circuit 53, a main converter 54, a positive electrode line 55, a negative electrode line 56, a cell group switching circuit 57, a line switch circuit 58, a switch drive circuit 59, a charging control circuit 60, a current detection circuit 61, a differential amplifier circuit 62, a low-pass filter 63, and an output setting circuit 64.

The power plug 50 is configured to be connected to an alternating (AC) power source, such as a commercial power source that supplies a voltage of, for example, AC 100 V, and to receive an AC power from the AC power source. The rectifier circuit 51 rectifies (e.g., full-wave rectifies) the AC power input from the power plug 50, and outputs the rectified electric power. The PFC circuit 52 improves a power factor of the AC power input to the rectifier circuit 51. The smoothing circuit 53 smoothes the electric power output from the PFC circuit 52. The smoothing circuit 53 of the present embodiment includes a capacitor to smooth the electric power input to the smoothing circuit 53. One of the purposes of providing the PFC circuit 52 is to make the power factor of the AC power closer to 1 by bringing the waveform of the AC current of the AC power input from the power plug 50 closer to a sine wave.

The main converter 54 converts a direct (DC) power smoothed by the smoothing circuit 53 into the charging power having a voltage suitable for charging the battery 20. In the present embodiment, the main converter 54 includes, for example, an insulated step-down switching power supply circuit. The main converter 54 is operated in accordance with a switching command input from the output setting circuit 64 to be described below, and generates the charging power.

The main converter 54 is connected to a first end of the positive electrode line 55 and to a first end of the negative electrode line 56. The charging power is supplied from the main converter 54 to the battery pack 10 via the positive electrode line 55 and the negative electrode line 56.

A second end of the positive electrode line 55 and a second end of the negative electrode line 56 are connected to the cell group switching circuit 57. The cell group switching circuit 57 includes a positive electrode switch 57a and a negative electrode switch 57b, which are operated in association with each other. The positive electrode switch 57a and the negative electrode switch 57b are C-contact type switches. The second end of the positive electrode line 55 is connected to a common terminal of the positive electrode switch 57a, and the second end of the negative electrode line 56 is connected to a common terminal of the negative electrode switch 57b.

A first terminal of the positive electrode switch 57a is connected to the positive terminal 41. A second terminal of the positive electrode switch 57a is connected to the center terminal 43. A first terminal of the negative electrode switch 57b is connected to the center terminal 43. A second terminal of the negative electrode switch 57b is connected to the negative terminal 42.

The cell group switching circuit 57 is switched to a first connection state or a second connection state in accordance with a switching command input from the charging control circuit 60. In the first connection state, the common terminal of the positive electrode switch 57a is connected to the first terminal of the positive electrode switch 57a, and the common terminal of the negative electrode switch 57b is connected to the first terminal of the negative electrode switch 57b. In the second connection state, the common terminal of the positive electrode switch 57a is connected to the second terminal of the positive electrode switch 57a, and the common terminal of the negative electrode switch 57b is connected to the second terminal of the negative electrode switch 57b.

In the present embodiment, the battery 20 is charged while the cell group switching circuit 57 is alternately switched between the first connection state and the second connection state. Specifically, the first cell group 21 is charged in the first connection state, and the second cell group 22 is charged in the second connection state.

The line switch circuit 58 is provided on the positive electrode line 55 to establish (complete) or interrupt the positive electrode line 55. The line switch circuit 58 is turned on or off by the charging control circuit 60 via the switch drive circuit 59. In response to turning-on of the line switch circuit 58, the positive electrode line 55 is established, thus allowing supply of the charging power to the battery pack 10. In response to turning-off of the line switch circuit 58, the positive electrode line 55 is interrupted, thus supplying no charging power to the battery pack 10. The line switch circuit 58 may be configured in any manner. The line switch circuit 58 may include, for example, at least one switching element (e.g., MOSFET) configured to establish or interrupt the positive electrode line 55.

The current detection circuit 61 is provided on the negative electrode line 56. The current detection circuit 61 outputs a current detection signal Si indicating a value of the electric current flowing through the negative electrode line 56. In the present embodiment, the current detection signal Si has a voltage value according to the value of the electric current. The current detection circuit 61 may include, for example, a shunt resistor (not shown) arranged on the negative electrode line 56, and may be configured to output the current detection signal Si according to a voltage across the shunt resistor.

The current detection signal Si is input to the charging control circuit 60 and to the differential amplifier circuit 62. The charging control circuit 60 generates a pulse-width modulation (PWM) signal according to the above-described charging current command value acquired from the battery pack 10 through data communication with the battery pack 10, namely, generates a pulse signal having a duty ratio according to the charging current command value, and outputs the generated PWM signal to the low-pass filter 63. The low-pass filter 63 smoothes the PWM signal input from the charging control circuit 60, and outputs the smoothed PWM signal to the differential amplifier circuit 62.

The differential amplifier circuit 62 outputs a differential signal Dif according to a difference between a voltage value of the PWM signal smoothed by the low-pass filter 63 and the voltage value of the current detection signal Si. The differential signal Dif is input to the output setting circuit 64, and is output, as the above-described switching command, to the main converter 54 via the output setting circuit 64. The main converter 54 generates the charging power based on the differential signal Dif input as the switching command so that the differential signal Dif becomes zero, namely, so that the value of the charging current output from the main converter 54 becomes equal to a current value indicated by the charging current command value.

The output setting circuit 64 is supplied with a charging voltage upper limit from the charging control circuit 60, and also supplied with a voltage value of the positive electrode line 55 (specifically, a voltage value between the main converter 54 and the line switch circuit 58). If the voltage value of the positive electrode line 55 is lower than or equal to the charging voltage upper limit, the output setting circuit 64 outputs the differential signal Dif to the main converter 54 as the switching command. If the voltage value of the positive electrode line 55 is higher than the charging voltage upper limit, the output setting circuit 64 outputs the switching command for reducing the charging power, to thereby reduce the voltage value of the charging power output from the main converter 54.

Provided between the main converter 54 and the line switch circuit 58 on the positive electrode line 55 is a rectifier circuit 65, a smoothing circuit 66, and a discharge circuit 67.

Since the main converter 54 of the present embodiment is insulated type, the charging power output from the main converter 54 is an AC power. The rectifier circuit 65 rectifies the charging power in the form of the AC power output from the main converter 54.

The smoothing circuit 66 includes a capacitor C41. A first terminal of the capacitor C41 is connected to the positive electrode line 55, and a second terminal of the capacitor C41 is connected to the negative electrode line 56. The smoothing circuit 66 smoothes the charging power rectified by the rectifier circuit 65.

The discharge circuit 67 discharges electric charges charged in the capacitor C41. The discharge circuit 67 includes resistors R41 and R42, and a switching element T41. The switching element T41 is, for example, an NPN-type bipolar transistor. A base of the switching element T41 is connected to the charging control circuit 60 via the resistor R42. An emitter of the switching element T41 is connected to the negative electrode line 56 (more specifically, between the main converter 54 and the current detection circuit 61). A collector of the switching element T41 is connected to the positive electrode line 55 via the resistor R41. Such a configuration allows discharge of the electric charges in the capacitor C41, in response to turning-on of the switching element T41 by the charging control circuit 60.

On the positive electrode line 55, a diode D41 is provided between the line switch circuit 58 and the cell group switching circuit 57. The diode D41 inhibits a reverse flow of the current from the positive terminal 41 or the center terminal 43 to the line switch circuit 58.

The charger 40 further includes a sub-converter 68. The sub-converter 68 converts the direct (DC) power smoothed by the smoothing circuit 53 into a power-supply power. The power-supply power has a voltage value different from a value of voltage output from the main converter 54. In the present embodiment, the sub-converter 68 includes, for example, an insulated step-down switching power supply circuit. Thus, the power-supply power output from the sub-converter 68 is an AC power.

The power-supply power output from the sub-converter 68 is rectified by a rectifier circuit 69 and smoothed by a smoothing circuit 70. A second power-supply voltage VD, which is a DC voltage output from the smoothing circuit 70, is used for a fan 90, a buzzer 93, and so on, to be described below.

The power-supply power output from the sub-converter 68 is further rectified by a rectifier circuit 71 and smoothed by a smoothing circuit 72. A DC voltage output from the smoothing circuit 72 is input to a power-supply circuit 73. The power-supply circuit 73 converts the DC voltage input from the smoothing circuit 72 into the first power supply voltage Vcc. The first power supply voltage Vcc is a DC voltage lower than the DC voltage input from the smoothing circuit 72. The first power supply voltage Vcc is used for relevant portions in the charger 40, including the charging control circuit 60.

The charger 40 further includes five terminal protection circuits 84, 85, 86, 87, and 88, an ES input circuit 74, an Rx circuit 75, a BD input circuit 76, and a Tx circuit 77. The terminal protection circuits 84, 85, 86, 87, and 88 have the same configuration.

The ES input circuit 74 is connected to the ES terminal 44 via the terminal protection circuit 84. The Rx circuit 75 is connected to the Rx terminal 45 via the terminal protection circuit 85. The BD input circuit 76 is connected to the BD terminal 46 via the terminal protection circuit 86. The Tx circuit 77 is connected to the Tx terminal 47 via the terminal protection circuit 87.

The terminal protection circuit 88 is connected to the Vcc terminal 48. The first power supply voltage Vcc is input to the terminal protection circuit 88. That is, the first power supply voltage Vcc can be output from the charger 40 via the terminal protection circuit 88 and the Vcc terminal 48. Thus, in response to attachment of the battery pack 10 to the charger 40, the first power supply voltage Vcc is input from the Vcc terminal 48 of the charger 40 to the Vcc/TFB terminal 18 of the battery pack 10.

The configuration of the terminal protection circuits 84, 85, 86, 87, and 88 will be described with reference to FIG. 4, with the terminal protection circuit 84 as an example. The terminal protection circuit 88 is shown in FIG. 5, and the terminal protection circuit 87 is shown in FIG. 6.

As shown in FIG. 4, the terminal protection circuit 84 includes two Zener diodes D43 and D44, a diode D45, and a varistor 96. A cathode of the Zener diode D43 is connected to the ES terminal 44, and an anode of the Zener diode D43 is connected to a cathode of the Zener diode D44. An anode of the Zener diode D44 is connected to a ground line via the varistor 96. A cathode of the diode D45 is connected to the ES terminal 44. An anode of the diode D45 is connected to the ES input circuit 74.

The diode D45 inhibits undesirable influence from being exerted on the inside of the charger 40 in a case where an external connection terminal (the ES terminal 44 in FIG. 4) connected to the diode D45 is shorted to another external connection terminal (e.g., the Rx terminal 45, the BD terminal 46, the Tx terminal 47, and the Vcc terminal 48).

The Zener diodes D43 and D44 are provided to protect the relevant external connection terminal (the ES terminal 44 in FIG. 4) from overvoltage. In the present embodiment, the Zener diodes D43 and D44 connected to each other in series are used because the rated voltage value of the battery 20 is a relatively high value (e.g., 57.6 V). If the rated voltage value of the battery 20 is low, a single Zener diode may be used.

The varistor 96 is provided to inhibit an unnecessary loop current from flowing between the charger 40 and the battery pack 10 during charging of the battery 20. In the present embodiment, as described above, the battery 20 is charged while the cell group switching circuit 57 is alternately switched between the first connection state and the second connection state.

Here, in the case where the cell group switching circuit 57 is in the first connection state, absence of the varistor 96 may lead to generation of the loop current as follows. Specifically, such loop current flows from the positive electrode of the second cell group 22 to the negative electrode of the second cell group 22 via the center terminal 13 of the battery pack 10, the center terminal 43 of the charger 40, the negative electrode switch 57b in the cell group switching circuit 57, the ground line of the charger 40, the Zener diodes D43 and D44 in the terminal protection circuit 84, the ES terminal 44 of the charger 40, the ES terminal 14 and the ES output circuit 24 in the battery pack 10, and the ground line of the battery pack 10.

A factor of generation of such loop current is that, in the first connection state, the potential of the ground line of the charger 40 becomes equal to the potential of the positive electrode of the second cell group 22 in the battery pack 10. Also in the external connection terminal other than the ES terminal 44, a loop current may be generated due to a similar factor. Thus, in the present embodiment, the varistor 96 is provided in the terminal protection circuits 84 to 88 to inhibit generation of the loop current described above.

As shown in FIG. 4, the ES input circuit 74 includes a first input circuit 74a and a second input circuit 74b. The first input circuit 74a includes resistors R43 and R44, and a switching element T42. The switching element T42 is, for example, a PNP-type bipolar transistor. A first terminal of the resistor R43 is connected to the terminal protection circuit 84 (specifically, the anode of the diode D45). A second terminal of the resistor R43 is connected to a base of the switching element T42. The first power supply voltage Vcc is applied to an emitter of the switching element T42. The resistor R44 is connected between the emitter and the base of the switching element T42.

The second input circuit 74b includes resistors R45, R46, and R47, and a switching element T43. The switching element T43 is, for example, an NPN-type bipolar transistor. A first terminal of the resistor R45 is connected to a collector of the switching element T42 in the first input circuit 74a. A second terminal of the resistor R45 is connected to a base of the switching element T43. An emitter of the switching element T43 is connected to the ground line. The resistor R46 is connected between the emitter and the base of the switching element T43. The first power supply voltage Vcc is applied to a collector of the switching element T43 via the resistor R47.

The voltage of the collector of the switching element T43 is output to the charging control circuit 60 and to the switch drive circuit 59 as an ES signal. A resistance value of the resistor R43 is, for example, approximately 2 kΩ, and a resistance value of the resistor R44 is, for example, approximately 20 kΩ.

In the battery pack 10, if the permission command is output from the battery control circuit 23 to the ES output circuit 24, the input impedance of the ES terminal 14 of the battery pack 10 becomes a low impedance as described above. Thus, in the ES input circuit 74 of the charger 40, the switching elements T42 and T43 are each turned on, and the ES signal of a LOW level (hereinafter referred to as an "ES permission signal") is output.

In the battery pack 10, if the prohibition command is output from the battery control circuit 23 to the ES output circuit 24, the input impedance of the ES terminal 14 of the battery pack 10 becomes a high impedance as described above. Thus, in the ES input circuit 74 of the charger 40, the switching elements T42 and T43 are each turned off, and the ES signal of a HIGH level (hereinafter referred to as an "ES prohibition signal") is output.

If the ES permission signal is input from the ES input circuit 74 to the charging control circuit 60, the charging control circuit 60 charges the battery 20 while performing data communication with the battery pack 10. Specifically, the charging control circuit 60 turns on the line switch circuit 58 via the switch drive circuit 59 and outputs the above-described PWM signal to cause the main converter 54 to generate the charging power, to thereby supply the charging power to the battery pack 10.

If the ES prohibition signal is input from the ES input circuit 74 to the charging control circuit 60, the charging control circuit 60 stops charging of the battery 20. Specifically, the charging control circuit 60 stops output of the PWM signal and turns off the line switch circuit 58 via the switch drive circuit 59.

If the ES permission signal is input from the ES input circuit 74 to the switch drive circuit 59, the switch drive circuit 59 turns on or off the line switch circuit 58 in accordance with a switch drive command input from the charging control circuit 60. That is, while the ES permission signal is input, control of the line switch circuit 58 by the charging control circuit 60 is enabled.

If the ES prohibition signal is input from the ES input circuit 74 to the switch drive circuit 59, the switch drive circuit 59 forcibly turns off the line switch circuit 58 independently of the switch drive command input from the charging control circuit 60. That is, while the ES prohibition signal is input, the control of the line switch circuit 58 by the charging control circuit 60 is disabled. The switch drive circuit 59 is configured to turn on or off the line switch circuit 58 by hardware processing without performing software processing.

If the ES prohibition signal is output from the ES input circuit 74 during charging, the charging control circuit 60 performs software processing for turning off the line switch circuit 58. In this case, there is a certain time lag between output of the ES prohibition signal and output of the switch drive command for turning off the line switch circuit 58 from the charging control circuit 60 to the switch drive circuit 59.

Thus, if the ES prohibition signal is output from the ES input circuit 74, the ES prohibition signal is input to the switch drive circuit 59 prior to input thereto of the switch drive command for turning off the line switch circuit 58 from the charging control circuit 60. Due to such a configuration, in the charger 40 of the present embodiment, if the ES prohibition signal is output from the ES input circuit 74, the line switch circuit 58 can be promptly turned off by hardware processing.

The Rx circuit 75 receives, via the Rx terminal 45, the transmission data transmitted from the battery pack 10, and relays the received data to the charging control circuit 60. The charging control circuit 60 acquires, via the Rx circuit 75, the transmission data received from the battery pack 10.

The BD input circuit 76 outputs, to the charging control circuit 60, a signal according to the impedance of the BD/TS terminal 16 of the battery pack 10 connected to the BD terminal 46. The charging control circuit 60 determines whether the battery pack 10 is attached to the charger 40, based on the signal input from the BD input circuit 76. Specifically, if the input impedance of the BD/TS terminal 16 of the battery pack 10 is the above-described first impedance, the charging control circuit 60 determines that the battery pack 10 is attached to the charger 40. If the input impedance of the BD/TS terminal 16 of the battery pack 10 is the above-described second impedance, the charging control circuit 60 determines that the battery pack 10 is not attached to the charger 40.

The Tx circuit 77 relays the transmission data output from the charging control circuit 60 to the battery pack 10. As shown in FIG. 6, the Tx circuit 77 includes resistors R48, R49, and R50, and a switching element T44. The switching element T44 is, for example, a PNP-type bipolar transistor.

A first terminal of the resistor R48 is connected to the terminal protection circuit 87 (specifically, the anode of the diode D45). A second terminal of the resistor R48 is connected to a collector of the switching element T44. The first power supply voltage Vcc is applied to an emitter of the switching element T44. The resistor R49 is connected between the emitter and a base of the switching element T44. A first terminal of the resistor R50 is connected to the base of the switching element T44. The transmission data is input to a second terminal of the resistor R50 from the charging control circuit 60. The transmission data output from the charging control circuit 60 is represented by a binary signal of a HIGH level or a LOW level.

The charger 40 further includes the fan 90, a locking detection circuit 91, and a temperature detection circuit 92. The fan 90 is rotated with the second power-supply voltage VD to supply cooling air to heat-generating parts in the charger 40 (e.g., a not-shown switching element in the main converter 54). The charging control circuit 60 drives the fan 90 continuously or intermittently during supply of the charging power to the battery pack 10.

The locking detection circuit 91 detects locking of the fan 90. If locking of the fan 90 is detected by the locking detection circuit 91 during driving of the fan 90, the charging control circuit 60 decreases the value of the current to be output from the main converter 54, thus inhibiting overheating of the switching element in the main converter 54.

The temperature detection circuit 92 detects a temperature of the switching element in the main converter 54. The charging control circuit 60 controls the value of the charging current based on the temperature detected by the temperature detection circuit 92 (i.e., controls the PWM signal). For example, if the detected temperature is higher than or equal to a temperature threshold, the charging control circuit 60 generates a PWM signal with a duty ratio lower than a duty ratio according to the charging current command value from the battery pack 10 to reduce the charging current.

The charger 40 further includes the buzzer 93 and an attenuator 94. The second power-supply voltage VD is input to the buzzer 93. Further, the battery power is input to the buzzer 93 from the battery pack 10 attached to the charger 40 via a diode D42 and the attenuator 94. The attenuator 94 steps down the battery voltage and outputs the stepped-down battery voltage to the buzzer 93. The buzzer 93 is operated with the second power-supply voltage VD or the battery power. The charging control circuit 60 activates the buzzer 93 in response to occurrence of various events, such as completion of charging of the battery 20, any malfunction, and so on. This enables the user to be aware of occurrence of such various events in an auditory manner.

In the charger 40 configured as above, in response to detection of attachment of the battery pack 10 to the charger 40 by the signal input from the BD input circuit 76, the charging control circuit 60 executes a charging control process for charging the battery 20. Specifically, the charging control circuit 60 performs serial data communication with the battery pack 10 to acquire various information including the above-described charging current command value. If charging of the battery 20 is necessary, the charging control circuit 60 turns on the line switch circuit 58 and outputs the PWM signal according to the charging current command value, to thereby initiate charging of the battery 20. As described above, the charging control circuit 60 performs charging of the battery 20 while alternately switching the cell group switching circuit 57 between the first connection state and the second connection state. That is, the charging control circuit 60 performs charging of the first cell group 21 and charging of the second cell group 22 in a parallel manner. The charging control circuit 60 may perform switching between the first connection state and the second connection state at any time point, for example, at regular intervals (e.g., every one minute).

Before initiating supply of the charging power to the battery pack 10 (specifically, before turning on the line switch circuit 58), the charging control circuit 60 discharge the electric charges from the capacitor C41 in the smoothing circuit 66 by controlling the discharge circuit 67. Specifically, the charging control circuit 60 turns on the switching element T41 in the discharge circuit 67 and keeps the switching element T41 ON for a specified period of time. The main reason for providing the discharge circuit 67 is to inhibit a large current from flowing from the capacitor C41 to the battery pack 10 at the start of charging.

(4) Configuration of Working Machine Body

As shown in FIG. 3, the working machine body 200 includes a positive terminal 201, a negative terminal 202, an ES terminal 204, an Rx terminal 205, a TS terminal 206, a Tx terminal 207, a TFB terminal 208, and a TD terminal 209.

In response to attachment of the battery pack 10 to the working machine body 200, the above-described terminals of the working machine body 200 are connected to the terminals of the battery pack 10 as follows. The positive terminal 201 is connected to the positive terminal 11 of the battery pack 10. The negative terminal 202 is connected to the negative terminal 12 of the battery pack 10. The ES terminal 204 is connected to the ES terminal 14 of the battery pack 10. The Rx terminal 205 is connected to the Tx terminal 15 of the battery pack 10. The TS terminal 206 is connected to the BD/TS terminal 16 of the battery pack 10. The Tx terminal 207 is connected to the Rx terminal 17 of the battery pack 10. The TFB terminal 208 is connected to the Vcc/TFB terminal 18 of the battery pack 10. The TD terminal 209 is connected to the TD terminal 19 of the battery pack 10.

The working machine body 200 includes no counterpart terminal to the center terminal 13 of the battery pack 10. Thus, in response to attachment of the battery pack 10 to the working machine body 200, the center terminal 13 of the battery pack 10 is not electrically connected to the working machine body 200 and is electrically open.

The working machine body 200 includes a motor drive circuit 211, a motor 212, a drive mechanism 213, an output tool 214, a drive switch 215, a switch drive circuit 216, the manipulator 217, a manipulation detection circuit 218, a drive control circuit 220, an ES input circuit 224, an Rx circuit 225, a TS input circuit 226, a Tx circuit 227, a TFB output circuit 228, a TD output circuit 229, and a power-supply circuit 230.

The battery power is input to the motor drive circuit 211 from the positive terminal 201 and the negative terminal 202. The motor drive circuit 211 supplies electric power to the motor 212 based on a drive command input from the drive control circuit 220. The motor 212 is rotated with the electric power supplied from the drive control circuit 220. The drive mechanism 213 transmits the rotation of the motor 212 to the output tool 214. The output tool 214 is driven with a rotational force of the motor 212 via the drive mechanism 213. The output tool 214 is configured to achieve a function of the electric working machine by acting on an object outside the working machine body 200. The output tool 214 may be, for example, a rotary blade for cutting grass, small-diameter trees, and so on. Alternatively, the output tool 214 may be, for example, a drill bit for making a hole in a workpiece. Still alternatively, the output tool 214 may be, for example, a blade for blowing or sucking air.

Provided on a current path between the positive terminal 201 and the motor drive circuit 211 is the drive switch 215 to establish or interrupt this current path. The drive switch 215 is controlled by the drive control circuit 220 via the switch drive circuit 216.

The manipulator 217 is manipulated by the user of the electric working machine. The manipulation detection circuit 218 detects manipulation of the manipulator 217 by the user. In response to detection of the manipulation by the user, the manipulation detection circuit 218 outputs a manipulation detection signal to the drive control circuit 220 and to the TD output circuit 229. In response to input of the manipulation detection signal to the drive control circuit 220, the drive control circuit 220 turns on the drive switch 215 and drives the motor drive circuit 211, to thereby rotate the motor 212.

A battery voltage Vp is input to the TS input circuit 226 from the positive terminal 201. The TS input circuit 226 outputs a battery voltage Vb depending on the impedance of the BD/TS terminal 16 of the battery pack 10. Specifically, if the input impedance of the BD/TS terminal 16 of the battery pack 10 is the above-described first impedance, the TS input circuit 226 outputs the input battery voltage Vp as the battery voltage Vb via a not-shown switching element. If the input impedance of BD terminal 16 of the battery pack 10 is the above-described second impedance, the TS input circuit 226 stops output of the battery voltage Vb. The battery voltage Vb is input to the power-supply circuit 230 and to the TFB output circuit 228.

The battery voltage Vb output from the TS input circuit 226 is input to the TFB output circuit 228. The TFB output circuit 228 steps down the input battery voltage Vb, and outputs the stepped-down battery voltage Vb from the TFB terminal 208 as the above-described body detection voltage.

The power-supply circuit 230 converts the battery voltage Vb into a control power-supply voltage Vdm in a DC voltage. The control power-supply voltage Vdm has a voltage value lower than the voltage value of the battery voltage Vb. Relevant portions within the working machine body 200, including the drive control circuit 220, are operated with the control power-supply voltage Vdm.

The ES input circuit 224 is connected to the ES terminal 204. The Rx circuit 225 is connected to the Rx terminal 205. The TS input circuit 226 is connected to the TS terminal 206. The Tx circuit 227 is connected to the Tx terminal 207. The TFB output circuit 228 is connected to the TFB terminal 208. The TD output circuit 229 is connected to the TD terminal 209.

In the present embodiment, the ES input circuit 224 has the same configuration as the ES input circuit 74 in the charger 40. Specifically, the ES input circuit 224 outputs the ES permission signal or the ES prohibition signal described above. The ES prohibition signal is input to the drive control circuit 220 and to the switch drive circuit 216.

If the ES permission signal is input to the drive control circuit 220, the drive control circuit 220 drives the motor 212 in accordance with manipulation of the manipulator 217. If the ES prohibition signal is input to the drive control circuit 220, the drive control circuit 220 stops operation of the motor drive circuit 211 and turns off the drive switch 215 even if the manipulator 217 is manipulated. If the ES permission signal is input to the switch drive circuit 216, the switch drive circuit 216 enables control of the drive switch 215 by the drive control circuit 220. However, if the ES prohibition signal is input to the switch drive circuit 216, the switch drive circuit 216 disables the control of the drive switch 215 by the drive control circuit 220, and forcibly turns off the drive switch 215.

The Rx circuit 225 receives the transmission data transmitted from the battery pack 10 via the Rx terminal 205, and relays the received data to the drive control circuit 220. The Rx circuit 225 may be configured, for example, similarly to the Rx circuit 75 in the charger 40.

The Tx circuit 227 relays, to the battery pack 10, the transmission data output from the drive control circuit 220. The Tx circuit 227 may be configured, for example, similarly to the Tx circuit 77 in the charger 40.

The TD output circuit 229 outputs the above-described manipulation signal indicating whether the manipulator 217 is manipulated, based on whether the manipulation detection signal is input from the manipulation detection circuit 218. This manipulation signal is output to the battery pack 10 via the TD terminal 209.

(5) Terminals Arrangement in Battery Pack and Charger

Figure 7:
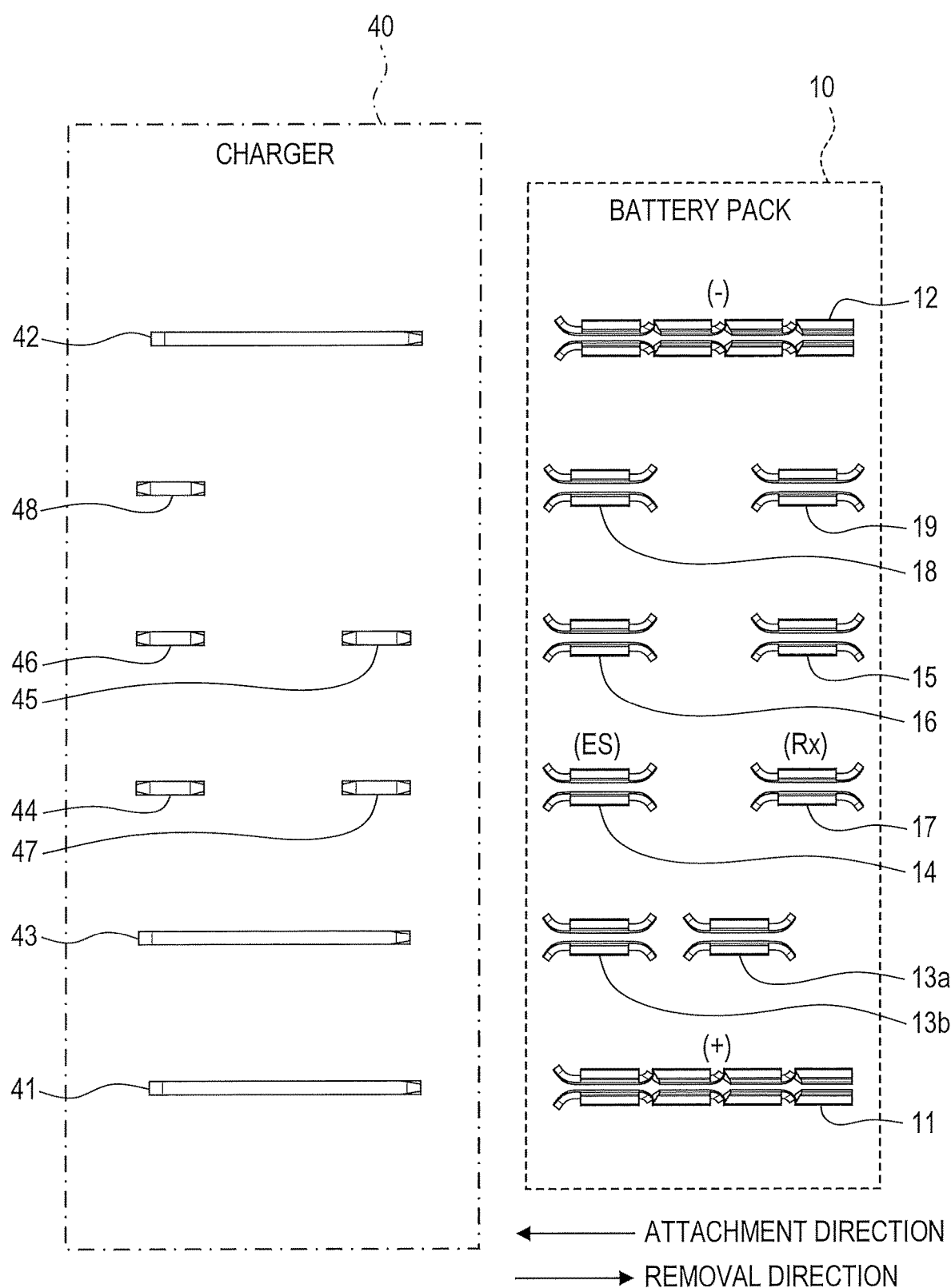
FIG. 7 is an explanatory diagram showing one example of terminals arrangement in the charger and the battery pack, and showing a state in which the battery pack is completely removed from the charger.

In the battery pack 10, the positive terminal 11, the negative terminal 12, the center terminal 13, the ES terminal 14, the Tx terminal 15, the BD/TS terminal 16, the Rx terminal 17, the Vcc/TFB terminal 18, and the TD terminal 19 are arranged as shown in FIG. 7. The center terminal 13 actually includes two divided terminals 13a and 13b as shown in FIG. 7. The divided terminals 13a and 13b are electrically connected to each other and have the same potential. FIG. 7 shows a state in which an arrangement surface on which these terminals are arranged is viewed in a direction orthogonal to the arrangement surface.

In the charger 40, the positive terminal 41, the negative terminal 42, the center terminal 43, the ES terminal 44, the Rx terminal 45, the BD terminal 46, the Tx terminal 47, and the Vcc terminal 48 are arranged as shown in FIG. 7. FIG. 7 shows a state in which an arrangement surface on which these terminals are arranged is viewed in a direction orthogonal to the arrangement surface.

The battery pack 10 is attached to the charger 40 by being moved with respect to the charger 40 in an attachment direction. The attachment direction corresponds to a leftward direction in FIG. 7. The battery pack 10 attached to the charger 40 is removed from the charger 40 by being moved with respect to the charger 40 in a removal direction opposite the attachment direction. The removal direction corresponds to a rightward direction in FIG. 7. A direction orthogonal to the attachment direction and the removal direction is hereinafter referred to as an orthogonal direction.

As shown in FIG. 7, in the present embodiment, the ES terminal 14, the Tx terminal 15, the BD/TS terminal 16, the Rx terminal 17, the Vcc/TFB terminal 18, and the TD terminal 19 of the battery pack 10 are arranged in two rows in the removal direction and arranged in three rows in the orthogonal direction.

Specifically, the ES terminal 14, the BD/TS terminal 16, and the Vcc/TFB terminal 18 are aligned at specified intervals in the orthogonal direction. That is, the positions of these three terminals in the removal direction coincide with one another.

The Rx terminal 17 is aligned with the ES terminal 14 in the removal direction (with a specified distance away from the ES terminal 14 in the removal direction). That is, the position of the ES terminal 14 in the orthogonal direction coincides with the position of the Rx terminal 17 in the orthogonal direction.

The Tx terminal 15 is aligned with the BD/TS terminal 16 in the removal direction (with a specified distance away from the BD/TS terminal 16 in the removal direction). That is, the position of the BD/TS terminal 16 in the orthogonal direction coincides with the position of the Tx terminal 15 in the orthogonal direction.

The TD terminal 19 is aligned with the Vcc/TFB terminal 18 in the removal direction (with a specified distance away from the Vcc/TFB terminal 18 in the removal direction). That is, the position of the Vcc/TFB terminal 18 in the orthogonal direction coincides with the position of the TD terminal 19 in the orthogonal direction.

If the battery pack 10 is completely removed from the charger 40, as shown in FIG. 7, the respective terminals of the battery pack 10 are not connected to their counterpart terminals in the charger 40.

Figure 8:
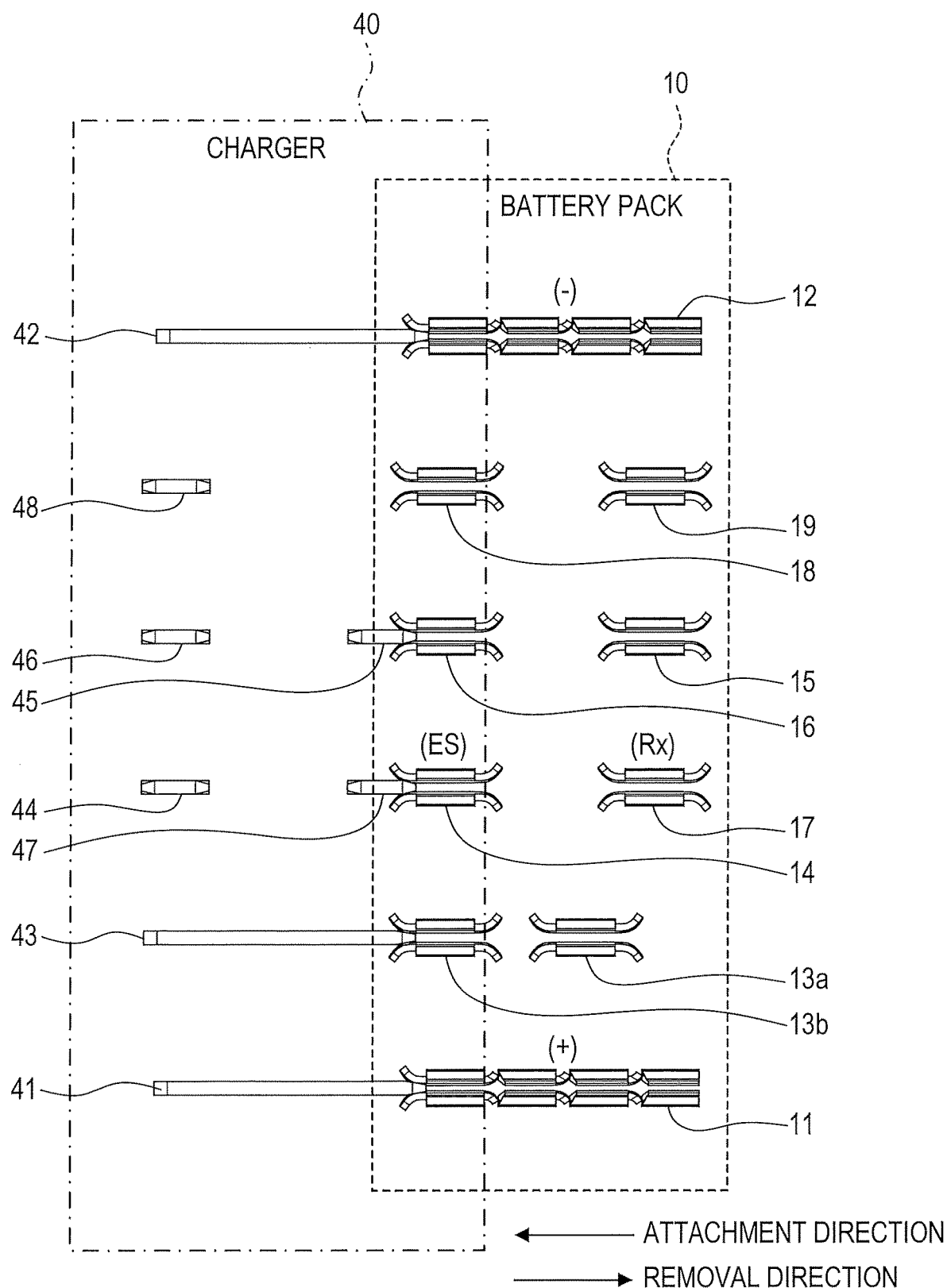
FIG. 8 is an explanatory diagram showing a state in which the battery pack is moved in an attachment direction from a position shown in FIG. 7 to initiate attachment of the battery pack.

In response to start of attachment of the battery pack 10 to the charger 40 by moving the battery pack 10 with respect to the charger 40 in the attachment direction, a positional relationship between the battery pack 10 and the charger 40 is changed as shown in FIG. 8, for example. Specifically, the positive terminal 11 of the battery pack 10 contacts the positive terminal 41 of the charger 40. The negative terminal 12 of the battery pack 10 contacts the negative terminal 42 of the charger 40. The center terminal 13 (specifically, the divided terminal 13b) of the battery pack 10 contacts the center terminal 43 of the charger 40. The ES terminal 14 of the battery pack 10 contacts the Tx terminal 47 of the charger 40. The BD/TS terminal 16 of the battery pack 10 contacts the Rx terminal 45 of the charger 40.

That is, the Rx terminal 45 and the Tx terminal 47 of the charger 40 temporarily contacts their non-counterpart terminals in the process of attaching the battery pack 10 to the charger 40. The non-counterpart terminals refer to terminals different from the terminals in the battery pack 10 counterpart to the Rx terminal 45 and the Tx terminal 47 (i.e., terminals different from the respective terminals to be connected to the Rx terminal 45 and the Tx terminal 47 in response to complete attachment of the battery pack 10).

Figure 9:
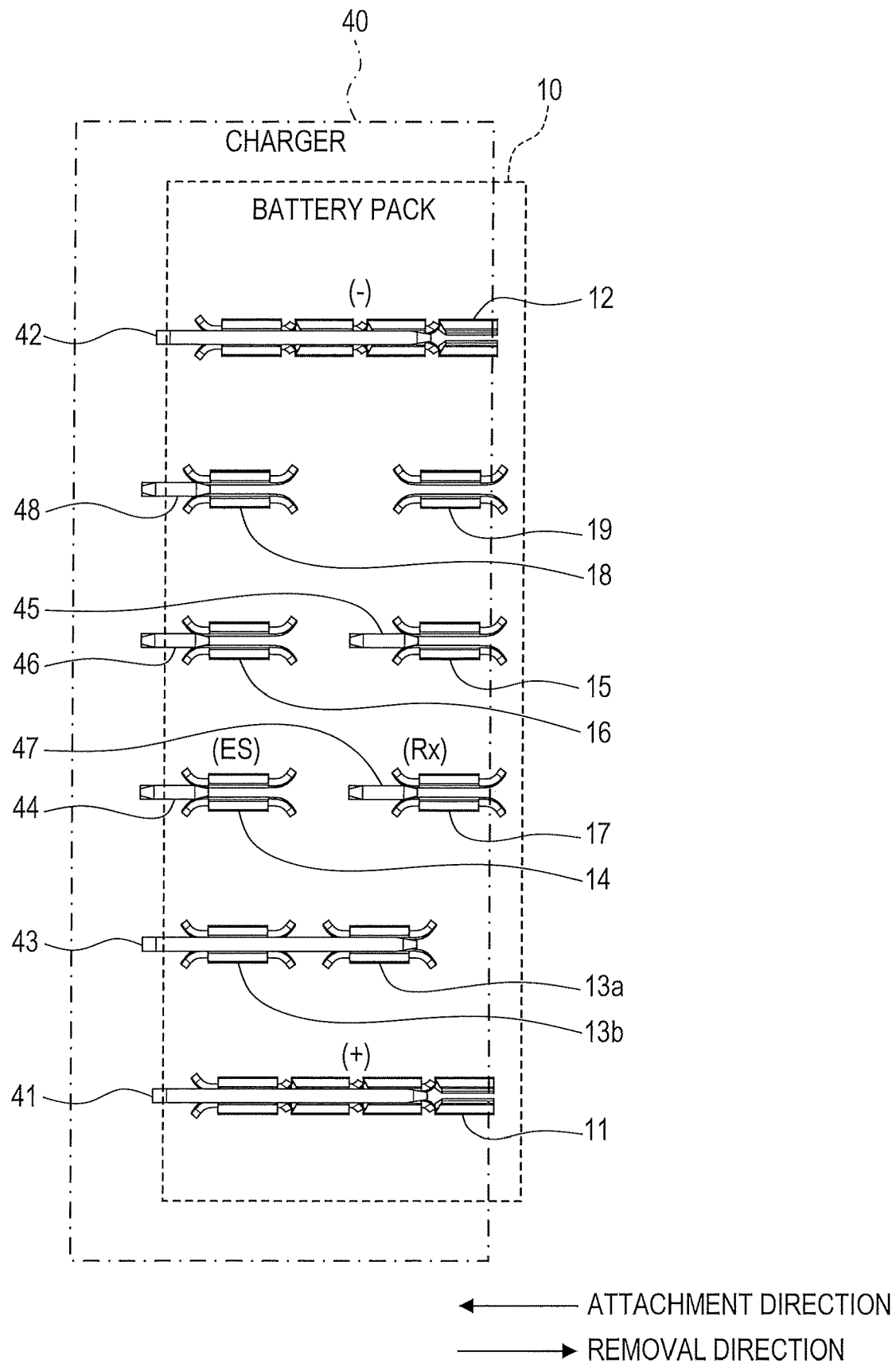
FIG. 9 is an explanatory diagram showing a state in which the battery pack is further moved in the attachment direction from a position shown in FIG. 8.

Further movement of the battery pack 10 with respect to the charger 40 in the attachment direction from the position of the battery pack 10 shown in FIG. 8 changes the positional relationship between the battery pack 10 and the charger 40 as shown in FIG. 9, for example. In the positional relationship shown in FIG. 9, the terminals of the battery pack 10 are connected to their counterpart terminals in the charger 40. Thus, in the positional relationship shown in FIG. 9, the battery pack 10 is not completely attached to the charger 40, but the battery pack 10 is electrically connected to the charger 40 completely.

Figure 10:
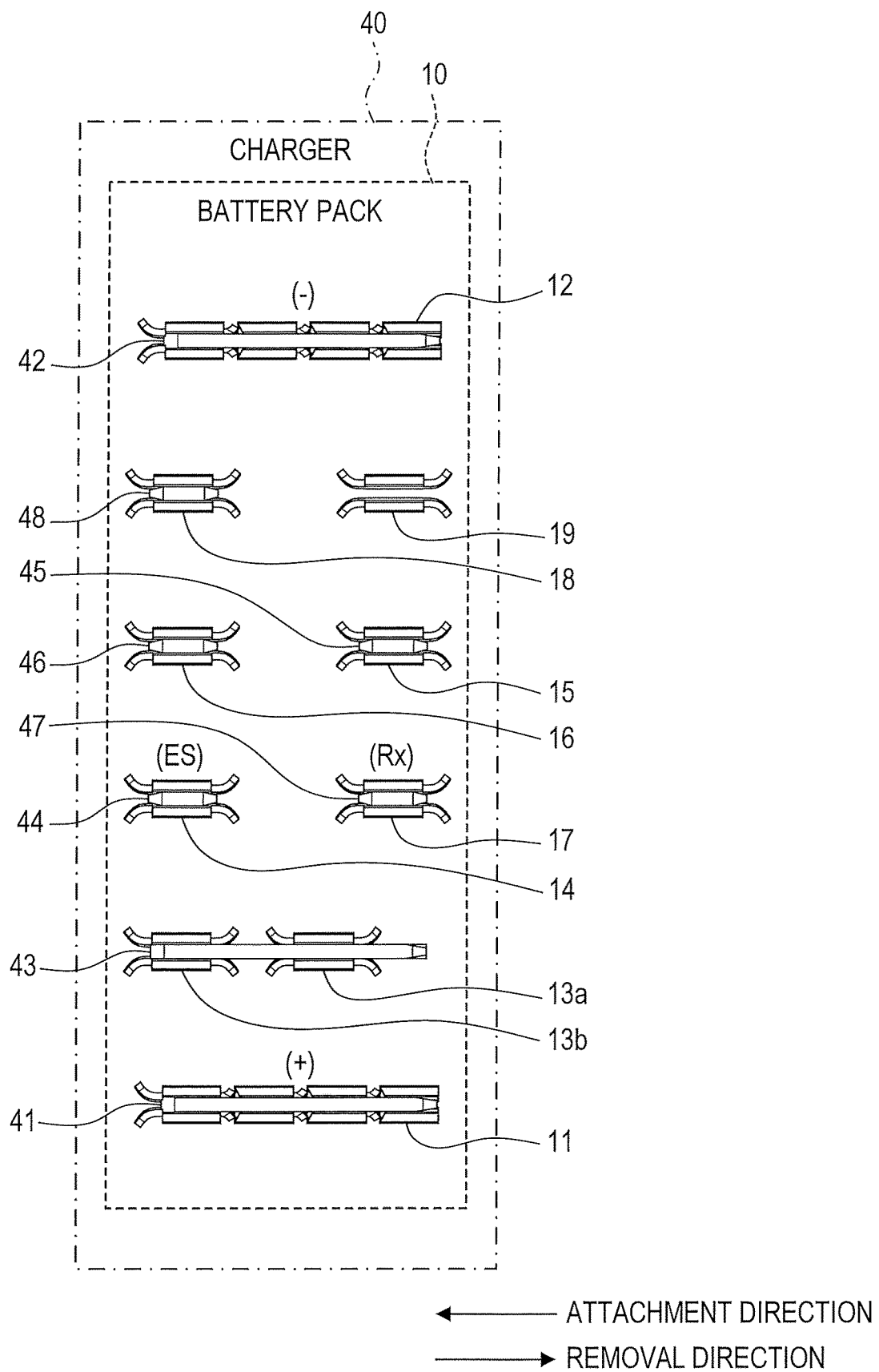
FIG. 10 is an explanatory diagram showing a state in which the battery pack is further moved in the attachment direction from a position shown in FIG. 9 to complete the attachment of the battery pack to the charger.

Further movement of the battery pack 10 with respect to the charger 40 in the attachment direction from the position of the battery pack 10 shown in FIG. 9 allows the battery pack 10 to be completely attached to the charger 40 as shown in FIG. 10.

In order to remove the battery pack 10 attached to the charger 40 as shown in FIG. 10 from the charger 40, the battery pack 10 is moved with respect to the charger 40 in the removal direction. Movement of the battery pack 10 in the removal direction changes the positional relationship between the battery pack 10 and the charger 40 in a manner reverse to attachment of the battery pack 10 to the charger 40. Thus, for example, the Tx terminal 47 of the charger 40 is removed from the counterpart Rx terminal 17 of the battery pack 10, and then, temporarily contacts the non-counterpart ES terminal 14, in the process of removing the battery pack 10 from the charger 40.

(6) Positions where ES Terminals are Arranged

In the present embodiment, the ES terminal 14 of the battery pack 10 and the ES terminal 44 of the charger 40 are arranged such that a non-counterpart terminal in the battery pack 10 does not contact the ES terminal 44 of the charger 40 in the process of removing the battery pack 10 from the charger 40. More specifically, in the present embodiment, each of the ES terminals 14 and 44 is arranged in the corresponding most upstream area in the removal direction. Thus, the ES terminal 44 does not contact the other terminals of the battery pack 10 following removal from the ES terminal 14.

The main reason why the ES terminal 44 is configured not to contact a non-counterpart terminal in the battery pack 10 in the removal process as described above is to inhibit a malfunction of the ES input circuit 74 in the charger 40. The malfunction of the ES input circuit 74 as mentioned here includes unintended output of the ES permission signal from the ES input circuit 74.

Here, a hypothetical situation will now be discussed in which, for example, the positional relationship between the ES terminal 44 and the Tx terminal 47 in the charger 40, and the positional relationship between the ES terminal 14 and the Rx terminal 17 in the battery pack 10 are opposite to those shown in FIG. 7. Specifically, in such a situation, the ES terminal 14 is arranged downstream of the Rx terminal 17 in the removal direction, and the ES terminal 44 is arranged downstream of the Tx terminal 47 in the removal direction. In this situation, the battery pack 10 is attached to the charger 40, and the battery 20 is charged by the charger 40. That is, in this situation, the line switch circuit 58 is turned on, and the charging current from the main converter 54 to the battery pack 10 flows through the positive electrode line 55. Further, in this situation, the battery pack 10 is removed from the charger 40 while the battery 20 is being charged.

In such a situation, in response to removal of the ES terminal 44 of the charger 40 from the ES terminal 14 of the battery pack 10 in the removal process, a signal output from the ES input circuit 74 in the charger 40 is changed from the ES permission signal to the ES prohibition signal. This causes a forcible turning-off of the line switch circuit 58. However, in immediate response to the forcible turning-off of the line switch circuit 58, the charging control circuit 60 outputs the PWM signal due to the influence of the above-described time lag and so on. Thus, the main converter 54 operates as normal despite the turning-off of the line switch circuit 58. As a result, a voltage value V1 (see FIG. 2) between the line switch circuit 58 and the main converter 54 on the positive electrode line 55 increases, and thus, difference between the voltage value V1 and a voltage value V2 (see FIG. 2) between the line switch circuit 58 and the cell group switching circuit 57 increases.

In response to further progress of removal of the battery pack 10, the ES terminal 44 contacts the non-counterpart Rx terminal 17. As described with reference to FIG. 6, the input impedance of the Rx terminal 17 is a low impedance. Thus, the state in which the ES terminal 44 is in contact with the Rx terminal 17 is electrically equivalent to the state in which the ES terminal 44 is in contact with the ES terminal 14 of the battery pack 10 during input of the permission command to the ES output circuit 24 in the battery pack 10. As a result, in the charger 40, the ES permission signal is output from the ES input circuit 74 to turn on the line switch circuit 58.

In response to turning-on of the line switch circuit 58 in the state where the voltage value V1 is higher than the voltage value V2, the difference between the voltage value V1 and the voltage value V2 may cause excessive current to flow through the line switch circuit 58, thus damaging the line switch circuit 58.

The malfunction of the ES input circuit 74 may be caused not only by the contact of the ES terminal 44 with the Rx terminal 17 but also by contact with any other terminals (e.g., the Tx terminal 15) in the battery pack 10 having a low input impedance (corresponding to the above-described low impedance).

To cope with this, the battery pack 10 and the charger 40 of the present embodiment are configured such that, in the removal process, the ES terminal 44 does not contact any terminals in the battery pack 10 following removal of the ES terminal 44 from the ES terminal 14.

The ES terminal 14 corresponds to one example of the third battery pack terminal of the present disclosure, the Rx terminal 17 corresponds to one example of the second battery pack terminal of the present disclosure, and the Vcc/TFB terminal 18 corresponds to one example of the first battery pack terminal of the present disclosure. The ES terminal 44 corresponds to one example of the third charger terminal of the present disclosure, the Tx terminal 47 corresponds to one example of the second charger terminal of the present disclosure, and the Vcc terminal 48 corresponds to one example of the first charger terminal of the present disclosure. The battery control circuit 23 and the ES output circuit 24 correspond to one example of the state setting circuit of the present disclosure. The ES input circuit 74 corresponds to one example of the functional circuit of the present disclosure, and the main converter 54 corresponds to one example of the charging circuit of the present disclosure. The positive electrode line 55 corresponds to one example of the electric power path of the present disclosure, and the line switch circuit 58 corresponds to one example of the switch circuit of the present disclosure. The charging control circuit 60 corresponds to one example of the switch control circuit of the present disclosure, and the switch drive circuit 59 corresponds to one example of the enabling circuit and the forcible interruption circuit of the present disclosure. The range lower than or equal to the first threshold corresponds to one example of the specified range of the present disclosure.

The embodiment of the present disclosure has been described so far; however, the present disclosure is not limited to the above-described embodiment and can be practiced in variously modified forms.

Other Example Embodiments (1) The ES terminals 14 and 44 may be arranged such that, in the process of removing the battery pack 10, the ES terminal 44 contacts a non-counterpart terminal in the battery pack 10 having a high input impedance (corresponding to the above-described high impedance) following removal of the ES terminal 44 from the ES terminal 14.

Figure 11:
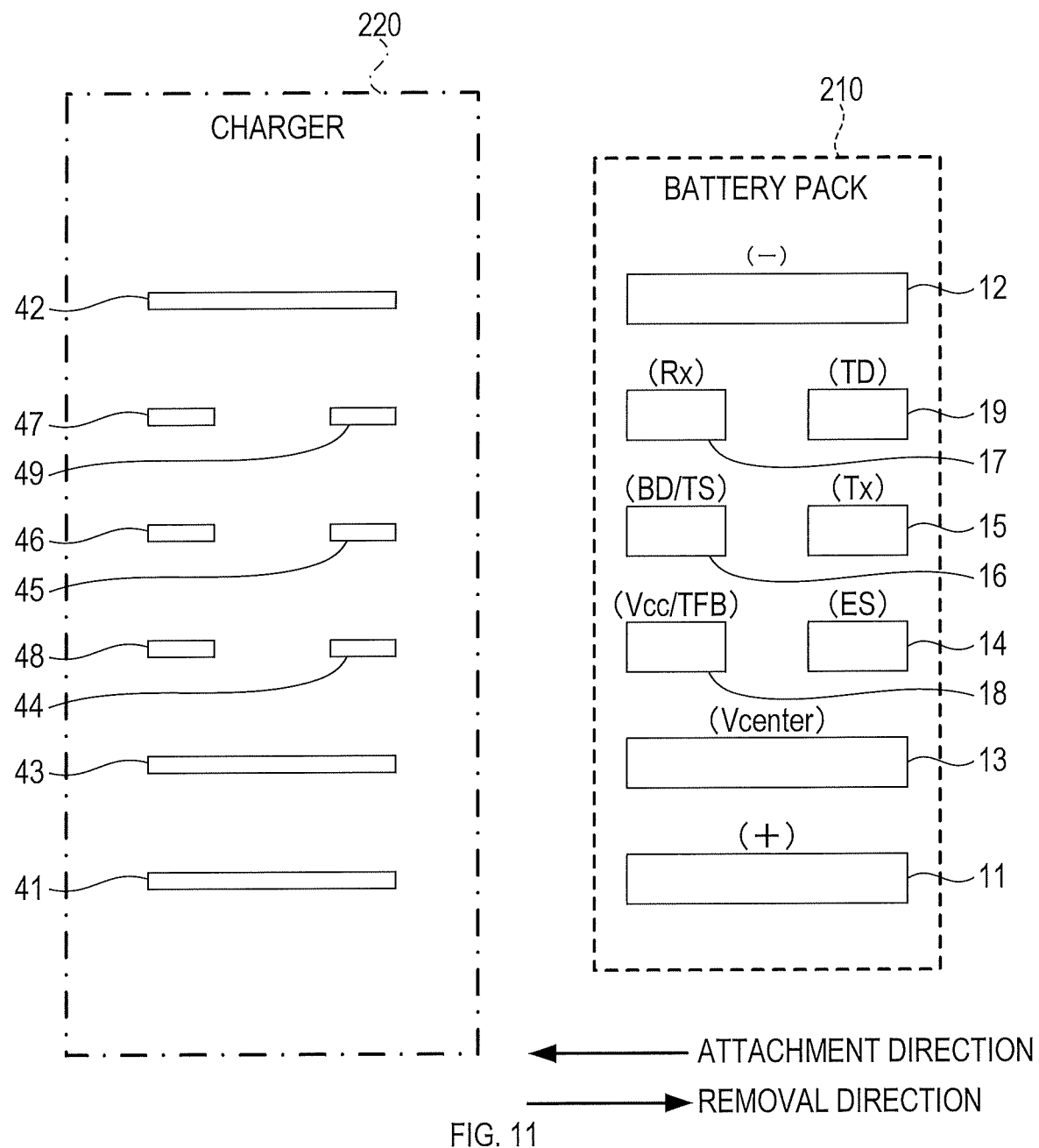
FIG. 11 is an explanatory diagram showing another example of terminals arrangement in a charger and a battery pack.

FIG. 11 shows a specific example of such arrangement. In FIG. 11, the ES terminal 44 is arranged in a downstream area in the removal direction. Arranged in an upstream area in the removal direction is the Vcc terminal 48. Thus, in the process of removing the battery pack 10, the ES terminal 44 contacts the Vcc/TFB terminal 18 of the battery pack 10 following removal from the ES terminal 14.

As described with reference to FIG. 5, the Vcc/TFB terminal 18 of the battery pack 10 has a high input impedance. Thus, even in the case where the ES terminal 44 contacts the Vcc/TFB terminal 18, a malfunction of the ES input circuit 74 in the charger 40 is not caused.

The non-counterpart terminal (specifically in the present embodiment, the terminal having a high input impedance) configured not to cause a malfunction of the ES input circuit 74 even in contact with the ES terminal 44 as described above may be arranged so as to contact the ES terminal 44 in the process of removing the battery pack 10.

(2) The terminals of the battery pack 10 and the charger 40 may be arranged in a different manner from that shown in FIGS. 7 and 11. For example, the non-counterpart terminal in the battery pack 10 having a low input impedance (i.e., the non-counterpart terminal that may cause a malfunction of the ES input circuit 74 in response to contact with the ES terminal 44) may be arranged so as to pass through an area not including the ES terminal 44 of the charger 40 in the process of removing the battery pack 10.

In other words, the ES terminal 44 may be arranged so as not to contact the non-counterpart terminal in the battery pack 10 having a low input impedance in the process of removing the battery pack 10.

For example, in FIG. 7, the Vcc/TFB terminal 18 may switch positions with the Tx terminal 15 (or with the BD/TS terminal 16 or the TD terminal 19). For example, in FIG. 7, the Rx terminal 17 may switch positions with the Tx terminal 15. For example, in FIG. 11, instead of the Vcc/TFB terminal 18, another terminal (e.g., the BD/TS terminal 16) having a high input impedance may be arranged in the position where the Vcc/TFB terminal 18 is arranged. For example, in FIG. 7, the ES terminal 14, the BD/TS terminal 16, and the Vcc/TFB terminal 18 do not necessarily have to be arranged in a line in the orthogonal direction. The same applies to the positional relationship of the Rx terminal 17, the Tx terminal 15, and the TD terminal 19.

Further, the total number of the terminals of the battery pack 10 and the charger 40 is not limited to that in the above-described embodiment, and the battery pack 10 and the charger 40 may include any number of terminals.

(3) The ES input circuit 74 of the charger 40 and the ES output circuit 24 of the battery pack 10 may be configured in any manner. In the above-described embodiment, the ES input circuit 74 is provided with the PNP-type bipolar transistor (the switching element T42) in its input stage. In another example embodiment, the ES input circuit 74 may be provided with, for example, a PNP-type bipolar transistor in its input stage, and may be configured to output the ES permission signal or the ES prohibition signal by turning-on or turning-off of this transistor.

The ES output circuit 24 may be configured to, for example, turn on the above-described transistor by outputting a HIGH-level signal to a base of the above-described transistor via the ES terminal 14 in response to input of the permission command from the battery control circuit 23. The ES output circuit 24 may be configured to, for example, turn off the above-described transistor by outputting a LOW-level signal to the base of the above-described transistor via the ES terminal 14 in response to input of the prohibition command from the battery control circuit 23.

Even in the case where the ES output circuit 24 is configured as above, the ES terminal 44 of the charger 40 may be arranged so as not to contact the non-counterpart terminal in the battery pack 10 that causes a malfunction of the ES input circuit 74 by contact with the ES terminal 44 (i.e., that turns on the above-described transistor) in the process of removing the battery pack 10.

(4) Two or more functions of a single element in the above-described embodiments may be achieved by two or more elements, and a single function of a single element may be achieved by two or more elements. Two or more functions of two or more elements may be achieved by a single element, and a single function achieved by two or more elements may be achieved by a single element. Part of the configuration of the above-described embodiments may be omitted. At least part of the configuration of the above-described embodiments may be added to or replaced by the configuration of the above-described other embodiments.

What is claimed is:

1. A charging system comprising:
a battery pack configured to be removably attached to an electric working machine; and
a charger configured such that the battery pack is removably attached thereto,
the battery pack including:
a battery configured to be charged with charging power supplied from the charger;
a first battery pack terminal having a high input impedance;
a second battery pack terminal having a low input impedance or being configured to have the low input impedance in response to the battery pack being in a normal state, the second battery pack terminal being spaced apart from the first battery pack terminal in an intersecting direction, the intersecting direction intersecting a removal direction of the battery pack from the charger;
a third battery pack terminal aligned with the first battery pack terminal or with the second battery pack terminal in the removal direction; and
a first circuit configured to set the third battery pack terminal such that the third battery pack terminal has the low input impedance, in response to the battery pack being in the normal state,
the low input impedance being lower than or equal to a first threshold, the high input impedance being higher than a second threshold, and the second threshold being higher than or equal to the first threshold,
the charger including:
a first charger terminal configured to be connected to the first battery pack terminal in response to attachment of the battery pack to the charger;
a second charger terminal configured to be connected to the second battery pack terminal in response to attachment of the battery pack to the charger;
a third charger terminal configured to be connected to the third battery pack terminal in response to attachment of the battery pack to the charger; and
a second circuit configured to output a first signal in response to connection of the third charger terminal to the third battery pack terminal having the low input impedance,
the second battery pack terminal being arranged so as to pass through an area spaced apart from the third charger terminal in a process of removing the battery pack from the charger.

2. A charging system comprising:
a battery pack configured to be removably attached to an electric working machine; and
a charger configured such that the battery pack is removably attached thereto,
the battery pack including:
a battery configured to be charged with charging power supplied from the charger;
a first battery pack terminal having a first electrical characteristic;
a second battery pack terminal having a second electrical characteristic or being configured to have the second electrical characteristic depending on an operating state of the battery pack, the second battery pack terminal being spaced apart from the first battery pack terminal in an intersecting direction, the intersecting direction intersecting a removal direction of the battery pack from the charger;
a third battery pack terminal aligned with the first battery pack terminal or with the second battery pack terminal in the removal direction; and
a state setting circuit configured to set, in response to the battery pack being in a presupposed operating state, an electrical characteristic of the third battery pack terminal such that the third battery pack terminal has the second electrical characteristic,
the charger including:
a first charger terminal configured to be connected to the first battery pack terminal in response to attachment of the battery pack to the charger;

a second charger terminal configured to be connected to the second battery pack terminal in response to attachment of the battery pack to the charger;
a third charger terminal configured to be connected to the third battery pack terminal in response to attachment of the battery pack to the charger; and
a functional circuit configured to perform a first function in response to connection of the third battery pack terminal having the second electrical characteristic to the third charger terminal,
the second battery pack terminal being arranged so as to pass through an area spaced apart from the third charger terminal in a process of removing the battery pack from the charger.

3. The charging system according to claim 2,
wherein the state setting circuit is configured to determine whether a malfunction is present, the malfunction corresponding to an event in which charging of the battery has to be stopped in the battery pack, and the presupposed operating state corresponds to a state in which the malfunction is not present.

4. The charging system according to claim 2,
wherein the first function includes output of an operation permission signal, and
wherein the charger further includes:
a charging circuit configured to generate the charging power;
an electric power path configured to supply the charging power to the battery pack;
a switch circuit configured to establish or interrupt the electric power path;
a switch control circuit configured to control the switch circuit;
an enabling circuit configured to enable control of the switch circuit by the switch control circuit in response to output of the operation permission signal; and
a forcible interruption circuit configured to disable the control of the switch circuit by the switch control circuit to thereby cause the switch circuit to interrupt the electric power path, in response to no output of the operation permission signal.

5. The charging system according to claim 2,
wherein the state setting circuit is configured to set the third battery pack terminal such that the third battery pack terminal has, as the second electrical characteristic, a first input impedance within a specified range,
wherein the first battery pack terminal has, as the first electrical characteristic, a second input impedance out of the specified range, and
wherein the second battery pack terminal has a third input impedance within the specified range.

6. The charging system according to claim 2,
wherein the state setting circuit is configured to set the third battery pack terminal such that the third battery pack terminal has, as the second electrical characteristic, a first input impedance within a specified range,
wherein the first battery pack terminal has, as the first electrical characteristic, a second input impedance out of the specified range, and
wherein the second battery pack terminal is configured to have a third input impedance within the specified range depending on the operating state of the battery pack.

7. The charging system according to claim 2,
wherein the third battery pack terminal is aligned with the first battery pack terminal in the removal direction.

8. The charging system according to claim 2,
wherein the third battery pack terminal is aligned with the second battery pack terminal in the removal direction, and
wherein the third battery pack terminal is arranged on an opposite side of the removal direction with respect to the second battery pack terminal.

9. A battery pack configured to be removably attached to an electric working machine and to a charger, the charger including a first charger terminal, a second charger terminal, and a third charger terminal, the battery pack comprising:
a battery configured to be charged with charging power supplied from the charger;
a first battery pack terminal configured to be connected to the first charger terminal in response to attachment of the battery pack to the charger, the first battery pack terminal having a first electrical characteristic;
a second battery pack terminal configured to be connected to the second charger terminal in response to attachment of the battery pack to the charger, the second battery pack terminal having a second electrical characteristic or being configured to have the second electrical characteristic depending on an operating state of the battery pack, the second battery pack terminal being spaced apart from the first battery pack terminal in an intersecting direction, the intersecting direction intersecting a removal direction of the battery pack from the charger;
a third battery pack terminal configured to be connected to the third charger terminal in response to attachment of the battery pack to the charger, the third battery pack terminal being aligned with the first battery pack terminal or with the second battery pack terminal in the removal direction; and
a state setting circuit configured to set, in response to the battery pack being in a presupposed operating state, an electrical characteristic of the third battery pack terminal such that the third battery pack terminal has the second electrical characteristic, the charger being configured to perform a first function in response to connection of the third battery pack terminal having the second electrical characteristic to the third charger terminal,
the second battery pack terminal being arranged so as to pass through an area spaced apart from the third charger terminal in a process of removing the battery pack from the charger.

10. A charger configured such that a battery pack is removably attached thereto, the battery pack including a first battery pack terminal, a second battery pack terminal, and a third battery pack terminal,
the charger being configured to supply charging power to the battery pack,
the charger comprising:
a first charger terminal configured to be connected to the first battery pack terminal in response to attachment of the battery pack to the charger, the first battery pack terminal having a first electrical characteristic;
a second charger terminal configured to be connected to the second battery pack terminal in response to attachment of the battery pack to the charger, the second battery pack terminal having a second electrical characteristic or being configured to have the second electrical characteristic depending on an operating state of the battery pack, the second charger terminal being spaced apart from the first charger terminal in an intersecting direction, the intersecting direction intersecting a removal direction of the battery pack from the charger;

a third charger terminal configured to be connected to the third battery pack terminal in response to attachment of the battery pack to the charger, the third charger terminal being aligned with the first charger terminal or with the second charger terminal in the removal direction, the third battery pack terminal having the second electrical characteristic in response to the battery pack being in a presupposed operating state; and a functional circuit configured to perform a first function in response to connection of the third battery pack terminal having the second electrical characteristic to the third charger terminal, the third charger terminal being arranged so as to pass through an area spaced apart from the second battery pack terminal in a process of removing the battery pack from the charger.

* * * * *